United States Patent
Shiina

(10) Patent No.: US 9,946,118 B2
(45) Date of Patent: Apr. 17, 2018

(54) DISPLAY DEVICE

(71) Applicant: Japan Display Inc., Minato-ku (JP)

(72) Inventor: Hideki Shiina, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/237,038

(22) Filed: Aug. 15, 2016

(65) Prior Publication Data

US 2016/0349563 A1 Dec. 1, 2016

Related U.S. Application Data

(63) Continuation of application No. 14/620,746, filed on Feb. 12, 2015, now Pat. No. 9,448,442.

(30) Foreign Application Priority Data

Feb. 21, 2014 (JP) ................. 2014-031463

(51) Int. Cl.
*G02F 1/1339* (2006.01)
*G02F 1/1337* (2006.01)
(Continued)

(52) U.S. Cl.
CPC ........ *G02F 1/13394* (2013.01); *G02F 1/1337* (2013.01); *G02F 1/1339* (2013.01);
(Continued)

(58) Field of Classification Search
None
See application file for complete search history.

(56) References Cited

U.S. PATENT DOCUMENTS 6,104,462 A 8/2000 Kurosaki
7,262,823 B2 8/2007 Morimoto et al.
(Continued)

FOREIGN PATENT DOCUMENTS

JP 2004 361623 12/2004
JP 2007-011272 1/2007
(Continued)

OTHER PUBLICATIONS

Office Action dated Oct. 17, 2017 in Japanese Application No. 2014-031463 filed Feb. 21, 2014 (w/English translation).

*Primary Examiner* — Dennis Y Kim
(74) *Attorney, Agent, or Firm* — Oblon, McClelland, Maier & Neustadt, L.L.P.

(57) ABSTRACT

To improve the reliability of a display device, a liquid crystal display device includes a substrate having a back surface, a substrate having a front surface opposing the back surface, a display functional layer arranged between the substrate and the substrate, and a sealing section SL that adhesively fixes the substrates around the display functional layer in a plan view. The sealing section SL includes a member PS extending along an outer edge of the display functional layer and sealing materials adjacently arranged on both sides of the member PS and continuously surrounding the periphery of the display functional layer in a plan view. The member PS includes a plurality of portions PS1 having a height TK1 and a plurality of portions PS2 arranged among the plurality of portions PS1 and having a height TK2 smaller than the height TK1.

8 Claims, 12 Drawing Sheets

(51) Int. Cl.
   *G02F 1/1335* (2006.01)
   *G02F 1/1368* (2006.01)
   *G02F 1/1343* (2006.01)
   *G02F 1/1333* (2006.01)

(52) U.S. Cl.
   CPC .. *G02F 1/133345* (2013.01); *G02F 1/133514* (2013.01); *G02F 1/1368* (2013.01); *G02F 1/13439* (2013.01); *G02F 1/133308* (2013.01); *G02F 1/133512* (2013.01); *G02F 1/133528* (2013.01); *G02F 1/134336* (2013.01); *G02F 2001/13396* (2013.01); *G02F 2001/13398* (2013.01); *G02F 2001/133302* (2013.01); *G02F 2201/121* (2013.01); *G02F 2201/123* (2013.01)

(56) References Cited

U.S. PATENT DOCUMENTS

| | | | |
|---|---|---|---|
| 7,751,007 B2 | 7/2010 | Morimoto et al. | |
| 7,952,680 B2 | 5/2011 | Terao et al. | |
| 8,081,286 B2 | 12/2011 | Kim et al. | |
| 8,334,963 B2* | 12/2012 | Yoshida | G02F 1/1339 349/153 |
| 8,643,819 B2* | 2/2014 | Yamamoto | G02F 1/133514 349/106 |
| 8,885,127 B2 | 11/2014 | Kanzaki et al. | |
| 9,069,218 B2 | 6/2015 | Yamamoto et al. | |
| 9,778,522 B2 | 10/2017 | Yamamoto et al. | |
| 2002/0131009 A1* | 9/2002 | Takeuchi | G02F 1/1339 349/153 |
| 2004/0233375 A1* | 11/2004 | Chung | G02F 1/1339 349/153 |
| 2004/0233376 A1* | 11/2004 | Chung | G02F 1/1339 349/153 |
| 2004/0246420 A1 | 12/2004 | Morimoto et al. | |
| 2007/0085952 A1 | 4/2007 | Morimoto et al. | |
| 2007/0165179 A1* | 7/2007 | Jang | G02F 1/13394 349/156 |
| 2010/0149477 A1* | 6/2010 | Nagami | G02F 1/1339 349/138 |
| 2011/0069271 A1* | 3/2011 | Chu | G02F 1/1339 349/153 |
| 2012/0033162 A1* | 2/2012 | Ahn | G02F 1/1339 349/106 |
| 2012/0075559 A1* | 3/2012 | Sonoda | G02F 1/1339 349/110 |
| 2012/0133874 A1* | 5/2012 | Hoshina | G02F 1/1339 349/138 |
| 2013/0077035 A1 | 3/2013 | Kanzaki et al. | |
| 2014/0092351 A1* | 4/2014 | Hatakeyama | G02F 1/1339 349/106 |
| 2014/0300848 A1* | 10/2014 | Mori | G02F 1/1339 349/106 |
| 2015/0185539 A1* | 7/2015 | Senokuchi | H05B 33/10 349/58 |

FOREIGN PATENT DOCUMENTS

| | | |
|---|---|---|
| JP | 2008-151969 | 7/2008 |
| JP | 2010-019877 | 1/2010 |
| JP | 2011-017831 | 1/2011 |
| WO | 2011 155133 A1 | 12/2011 |

* cited by examiner

DISPLAY DEVICE

CROSS-REFERENCE TO RELATED APPLICATIONS

The present application is a continuation of U.S. patent application Ser. No. 14/620,746, filed Feb. 2, 2015, which claims priority from Japanese Patent Application No. 2014-031463 filed on Feb. 21, 2014, the content of which is hereby incorporated by reference into this application.

TECHNICAL FIELD OF THE INVENTION

The present invention relates to a display device, for example, a technique effectively applied to a liquid crystal display device in which a pair of substrates is arranged to oppose each other and a liquid crystal layer is formed between the opposing substrates.

BACKGROUND OF THE INVENTION

A display device, in which a display functional layer such as a liquid crystal layer is arranged between a pair of substrates arranged to oppose each other, to seal the periphery of the display functional layer, has been known.

For example, International Publication No. WO2011/155133 (Patent Document 1) describes a technique for suppressing spreading of an oriented film material formed on the side of a liquid crystal layer toward a sealing material by forming a recess in an insulating film covering a surface of a support substrate as a method for manufacturing a liquid crystal display device.

Japanese Patent Laid-Open No. 2004-361623 (Patent Document 2) describes a technique for suppressing spreading of an oriented film by uniformly forming at least one of a notch and a hole around a region where the oriented film is formed.

SUMMARY OF THE INVENTION

A display device has a configuration in which a display functional layer such as a liquid crystal layer is formed between a pair of substrates, the pair of substrates is adhesively fixed with a sealing material in a sealing section surrounding the display functional layer, so that the display functional layer is protected.

A material forming members constituting the display device may include a material having a high fluidity. In a liquid crystal display device, for example, a material used as an oriented film for aligning an orientation of a liquid crystal may include a resin material having a high fluidity such as polyimide resin. If the oriented film is formed in a display region on a pair of substrates in the liquid crystal display device, therefore, the oriented film may easily spread to the periphery of the display region.

If a wide space is ensured around the display region, the oriented film and a sealing material may be prevented from overlapping each other by significantly increasing a separation distance between the display region and the sealing section. However, an attempt to reduce the area of a so-called frame section or frame region serving as a non-display section surrounding the periphery of the display region causes the following problems.

More specifically, if the area of the frame section is reduced, the separation distance between the display region and the sealing section needs to be decreased. When the oriented film too spreads, therefore, the oriented film remains sandwiched between the substrate and the sealing material, causing a sealing property of the sealing section to deteriorate.

A member for damping the oriented film may be provided in the frame region so as to suppress spreading of the oriented film. To reduce the area of the frame region, however, the damping member needs to be provided in the sealing section. That is, there is a region where the sealing material and the oriented film partially overlap each other. In a process for sealing the pair of substrates among processes for manufacturing the liquid crystal display device, the sealing material is applied to the sealing section, and the opposing substrates are brought closer to each other, thereby pushing out and sealing the sealing material. However, the damping member arranged in the sealing section may cause spreading of the sealing section to be inhibited.

The present invention is directed to providing a technique for improving the reliability of a display device or a technique for reducing the area of a frame section in the display device.

According to an aspect of the present invention, a display device includes a first substrate having a first surface, a second substrate having a second surface opposing the first surface of the first substrate, a display functional layer arranged between the first substrate and the second substrate, and a sealing section that adhesively fixes the first substrate and the second substrate around the display functional layer. The sealing section includes a first member arranged around the display functional layer and extending along an outer edge of the display functional layer in a plan view, and sealing materials adjacently arranged on both sides of the first member and continuously surrounding a periphery of the display functional layer in a plan view. The first member includes a plurality of first portions having a first height, and a plurality of second portions arranged among the plurality of first portions and having a second height smaller than the first height.

According to another aspect of the present invention, the plurality of first portions and the plurality of second portions in the first member are alternately arranged.

According to another aspect of the present invention, each of the plurality of first portions in the first member contacts the first surface and the second surface, and each of the plurality of second portions contacts either one of the first surface and the second surface and does not contact the other surface.

According to another aspect of the present invention, the display functional layer is a liquid crystal layer, the first substrate has an oriented film formed on the first surface serving as an interface contacting the liquid crystal layer, and a part of the sealing material overlaps a peripheral edge of the oriented film in a thickness direction, on the side of the display functional layer of the first member.

According to another aspect of the present invention, each of the plurality of first portions in the first member has a first length in a direction in which the first member extends, each of the plurality of second portions in the first member has a second length in a direction in which the first member extends, and the first length is smaller than the second length.

According to another aspect of the present invention, each of the plurality of first portions in the first member has a first length in a direction in which the first member extends, each of the plurality of second portions in the first member has a second length in a direction in which the first member extends, and a value obtained by dividing the first length by a sum of the first length and the second length is not less than 5% and not more than 30%.

According to another aspect of the present invention, the first member is formed to continuously surround a periphery of a display section where the display functional layer is formed, in a plan view.

According to another aspect of the present invention, the first substrate includes, in a plan view, a first side extending in a first direction, a second side opposing the first side, a third side extending in a second direction perpendicular to the first direction, and a fourth side opposing the third side. A distance from a display section where the display functional layer is formed to the first side in a plan view is longer than a distance from the display section to the second side, a distance from the display section to the third side, and a distance from the display section to the fourth side. The first member extends along each of the second side, the third side, and the fourth side.

According to another aspect of the present invention, a color filter and a resin layer covering the color filter are formed on the side of the first surface of the first substrate, and the first member is formed on the first surface which the resin layer has.

According to another aspect of the present invention, a plurality of spacer members are formed between the first substrate and the second substrate in a display section where the display functional layer is formed, and the plurality of spacer members include a first spacer member having the same height as that of the first portion in the first member and a second spacer member having the same height as that of the second portion in the first member.

According to another aspect of the present invention, the sealing material does not include a glass fiber.

According to an aspect of the present invention, a method for manufacturing a display device includes a step of forming a first member on a first surface of a first substrate, and then forming an oriented film on the first surface, a step of forming the oriented film, and then applying a sealing material to a sealing section along the first member, and a step of applying the sealing material, and then adhesively fixing a second substrate having a second surface opposing the first surface and the first substrate to each other by the sealing section. The sealing section is provided to surround a display section in a plan view. The first member includes a plurality of first portions having a first height and a plurality of second portions arranged among the plurality of first portions and having a second height smaller than that of the first height.

BRIEF DESCRIPTIONS OF THE DRAWINGS

DESCRIPTIONS OF THE EMBODIMENTS

Figure 1:
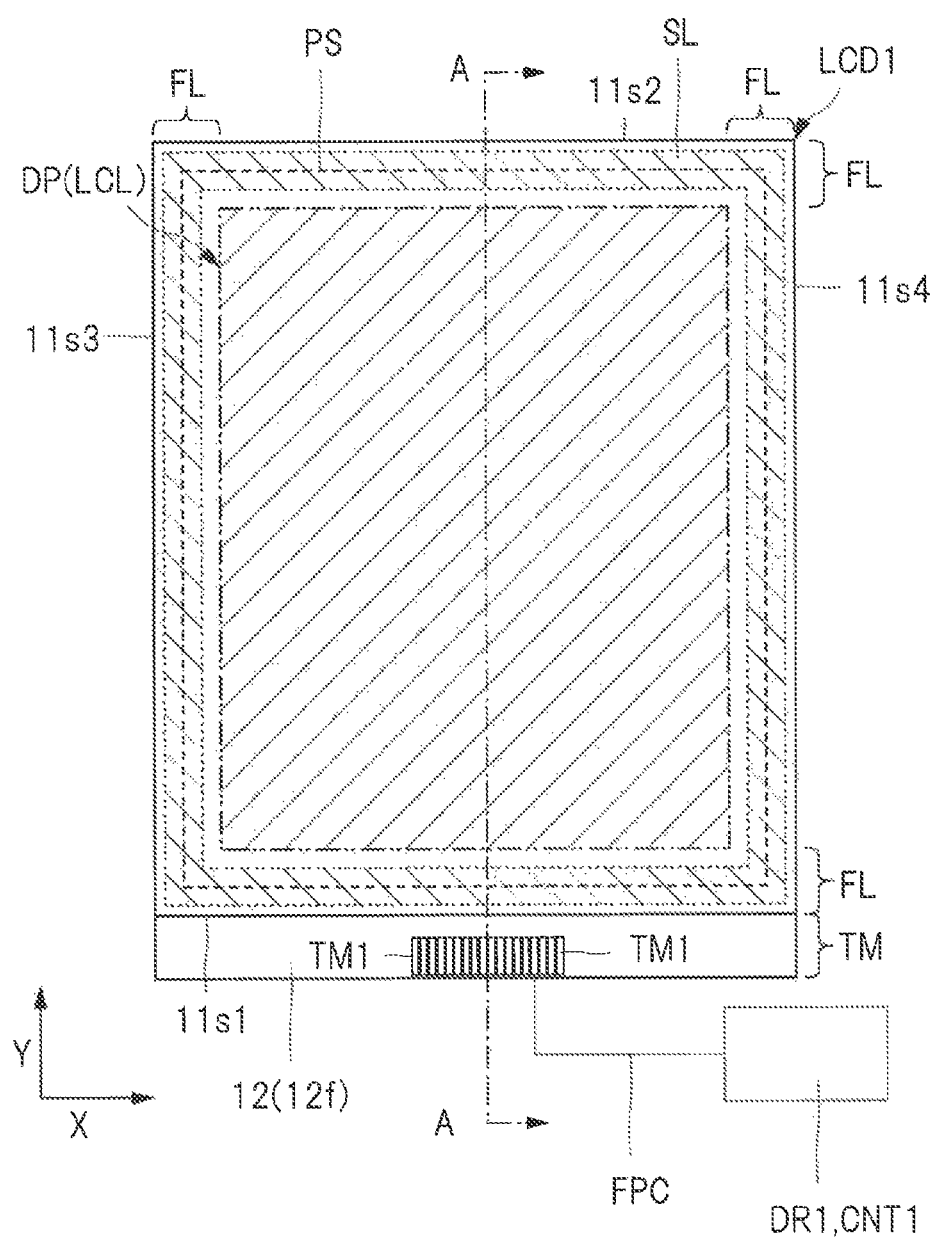
FIG. 1 is a plan view illustrating an example of a liquid crystal display device according to an embodiment.

Hereinafter, embodiments of the present invention will be described with reference to drawings. Note that the disclosures are provided by way of example, and any suitable variations easily conceived by a person with ordinary skill in the art while pertaining to the gist of the invention are of course included in the scope of the present invention. Further, the drawings, widths, thicknesses and shapes of respective components may be schematically illustrated in comparison with the embodiments for the purpose of making the description more clearly understood, but these are merely examples, and do not limit the interpretations of the present invention. Further, in the specification and drawings, elements which are similar to those already mentioned with respect to previous drawings are denoted by the same reference characters, and detailed descriptions thereof will be suitably omitted.

In the following embodiment, a liquid crystal display device including a liquid crystal layer serving as a display functional layer will be specifically described as an example of a display device. The liquid crystal display device is broadly classified into two categories, described below, depending on an application direction in which an electric field for changing an orientation of liquid crystal molecules in the liquid crystal layer serving as the display functional layer. More specifically, the first category is a so-called vertical electric field mode in which an electric field is applied in a thickness direction (or an out-of-plane direction) of the liquid crystal display device. Examples of the vertical electric field mode include a Twisted Nematic (TN) mode and a Vertical Alignment (VA) mode. The second category is a so-called horizontal electric field mode in which an electric field is applied in a planar direction (or an in-plane direction) of the liquid crystal display device. Examples of the horizontal electric field mode include an In-Plane Switching (IPS) mode and a Fringe Field Switching (FFS) mode serving as one type of the IPS mode. While a technique described below is applicable to both the vertical electric field mode and the horizontal electric field mode. However, a display device in the horizontal electric field mode will be described as an example in the present embodiment.

<Basic Configuration of Liquid Crystal Display Device>

Figure 2:
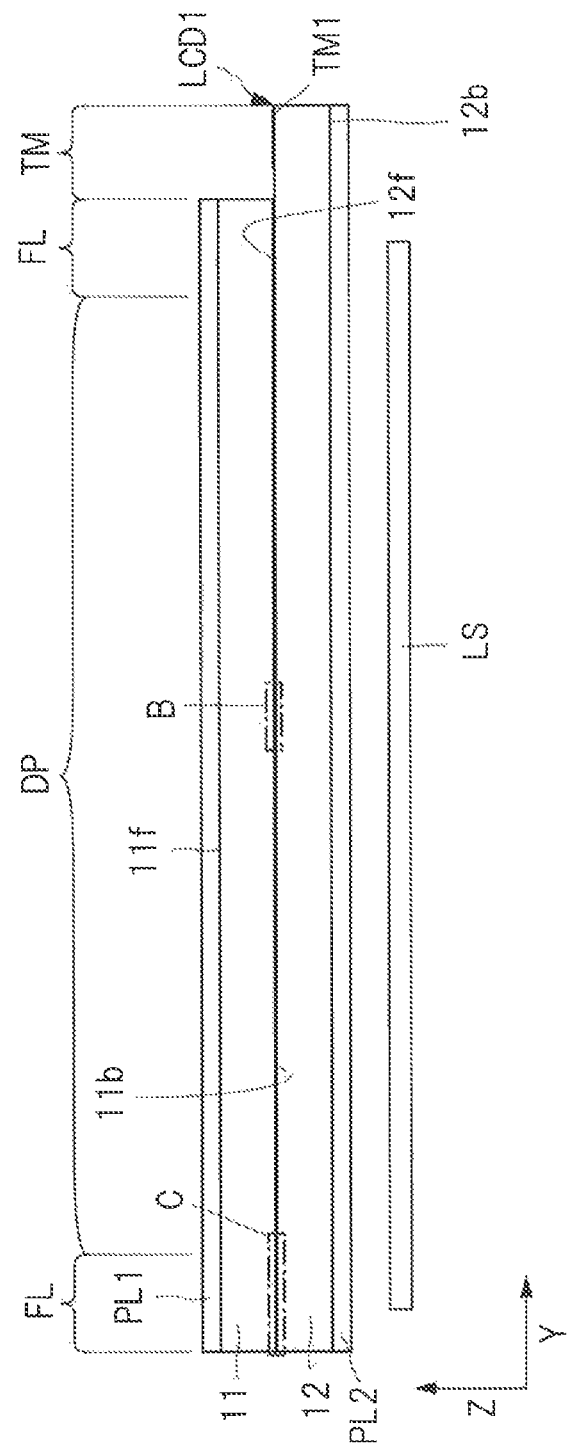
FIG. 2 is a cross-sectional view taken along a line A-A illustrated in FIG. 1.
Figure 3:
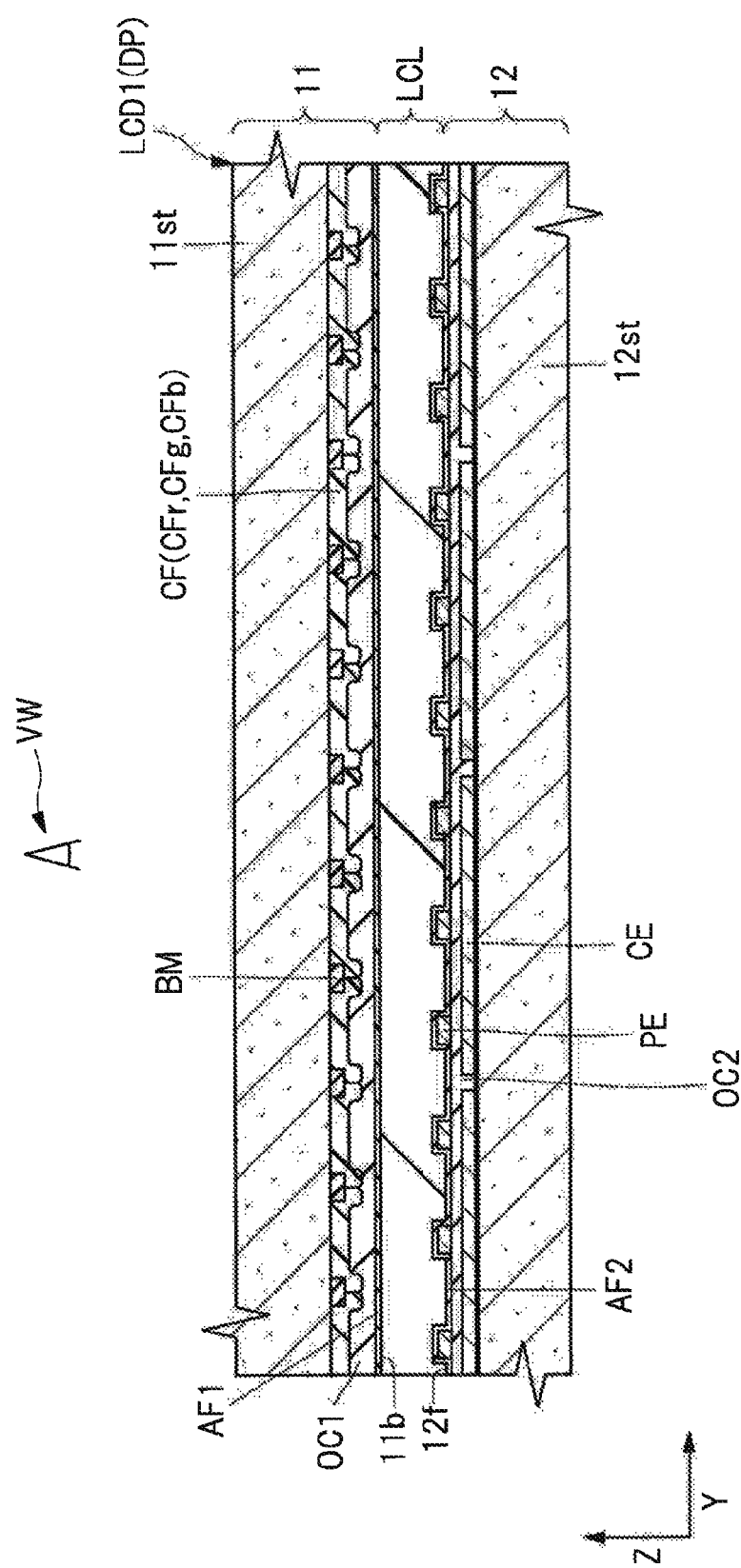
FIG. 3 is an enlarged sectional view of a portion B illustrated in FIG. 2.
Figure 4:
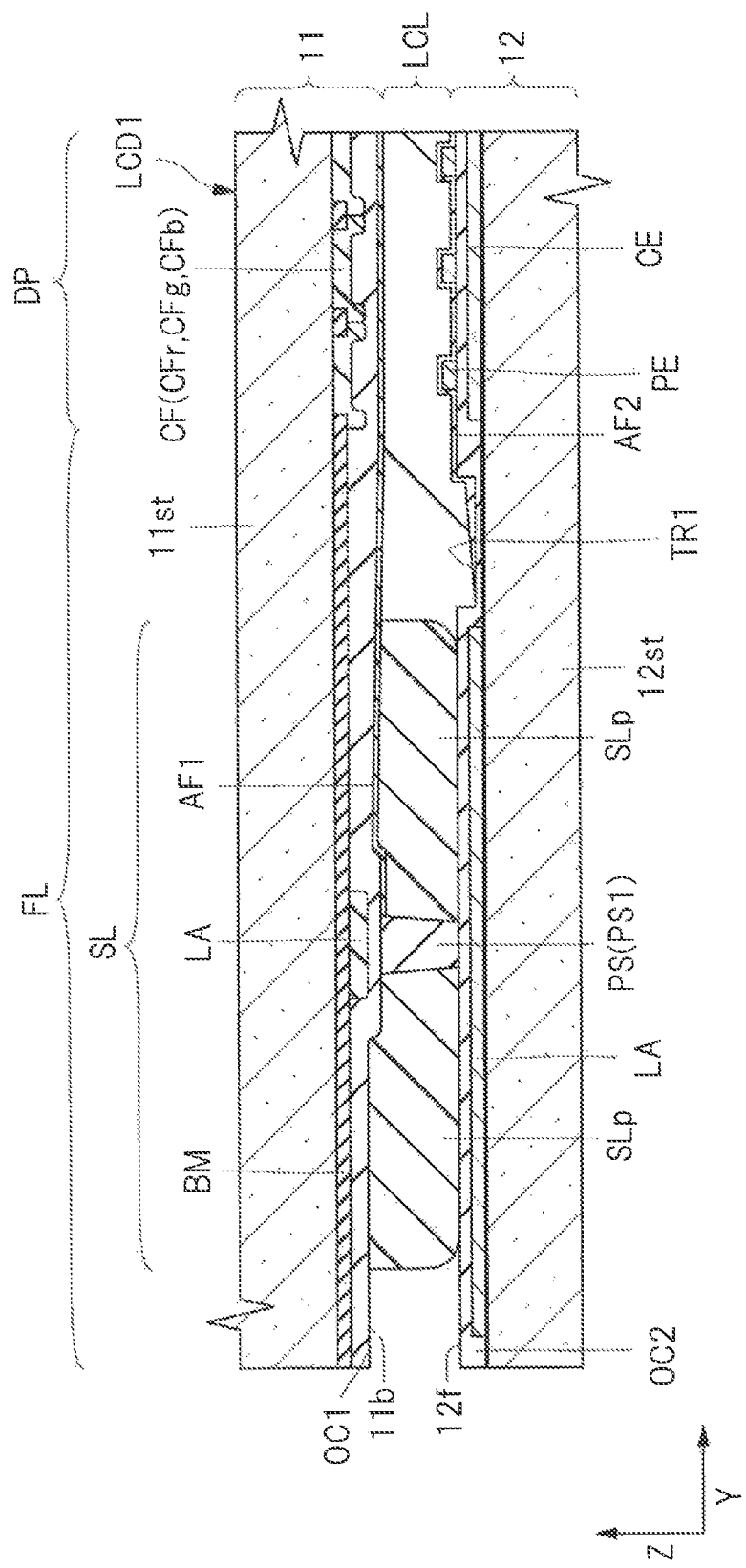
FIG. 4 is an enlarged sectional view of a portion C illustrated in FIG. 2.

A basic configuration of the display device will be first described. FIG. 1 is a plan view illustrating an example of a liquid crystal display device according to the present embodiment, and FIG. 2 is a cross-sectional view taken along a line A-A illustrated in FIG. 1. FIG. 3 is an enlarged sectional view of a portion B illustrated in FIG. 2. FIG. 4 is an enlarged sectional view of a portion C illustrated in FIG. 2.

While FIG. 1 is a plan view, a display section DP is hatched, and a contour of the display section DP is indicated by a two-dot and dash line to make a boundary between the display section DP and a frame section FL easy to see in a plan view. In FIG. 1, a sealing section SLP is hatched, and a contour of the sealing section SL is indicated by a dotted line to make a planar shape of the sealing section SL provided to surround the periphery of the display section D to see. In FIG. 1, to explicitly indicate a layout in a plan view of a member PS illustrated in FIG. 4, a contour of the member PS is indicated by a dotted line. While FIG. 2 is a cross-sectional view, the hatching is omitted for ease of viewing.

As illustrated in FIG. 1, the liquid crystal display device LCD1 according to the present embodiment includes the display section DP serving as a display region where an image, which can be viewed from outside in response to an input signal, is formed. The liquid crystal display device LCD1 includes the frame section FL serving as a non-display region provided in a frame shape around the display section DP in a plan view. The liquid crystal display device LCD1 further includes a terminal section TM provided outside the frame section FL, in a plan view. In the terminal section TM, a plurality of terminals TM1 for supplying an electric signal or a voltage for driving to a plurality of elements for display formed in the display section DP, are formed.

As schematically illustrated in FIG. 1, the plurality of terminals TM1 are connected to a wiring path FPC. The wiring path FPC is a so-called flexible wiring board in which a plurality of wirings are formed in a resin film and which can be freely deformed depending on a shape of an arrangement location. The plurality of terminals TM1 are electrically connected to a driving circuit DR1 or a control circuit CM1 for image display via the wiring path FPC.

The liquid crystal display device LCD1 has a configuration in which a liquid crystal layer is formed between a pair of substrates arranged to oppose each other. More specifically, as illustrated in FIG. 2, the liquid crystal display device LCD1 includes a substrate 11 on the side of the display surface, a substrate 12 positioned on the opposite side of the substrate 11, and a liquid crystal layer LCL arranged between the substrate 11 and the substrate 12 (see FIG. 3).

The liquid crystal display device LCD1 includes the sealing section SL formed in the frame section FL around the display section DP having the liquid crystal layer LCL formed therein in a plan view, as illustrated in FIG. 1. The sealing section SL is formed to continuously surround the periphery of the display section DP, and the substrate 11 and the substrate 12 illustrated in FIG. 2 are adhesively fixed to each other with a sealing material provided in the sealing section SL illustrated in FIGS. 1 and 4. Thus, the sealing section SL is provided around the display section DP, so that the liquid crystal layer LCL formed in the display section DP and a part of the frame section FL can be sealed.

As illustrated in FIG. 2, a polarizing plate PL2, which polarizes light generated from the light source LS, is provided on the side of a back surface 12b of the substrate 12 in the liquid crystal display device LCD1. The polarizing plate PL2 is adhesively fixed to the substrate 12 via an adhesive layer. On the other hand, a polarizing plate PL1 is provided on the side of a front surface 11f of the substrate 11. The polarizing plate PL1 is adhesively fixed to the substrate 11 via an adhesive layer.

While basic components for forming a display image are illustrated in FIG. 2, another component can be added in addition to the components illustrated in FIG. 2 as a modification example. For example, a protective film or a cover member may be attached to the side of the front surface of the polarizing plate PL1 as a protective layer for protecting the polarizing plate PL1 from a flaw or dirt. For example, the present invention is applicable to an example in which an optical film such as a phase difference plate is affixed to the polarizing plate PL1 and the polarizing plate PL2. Alternatively, a method for forming the optical film is applicable to each of the substrate 11 and the substrate 12. As a modification example corresponding to FIG. 1, a semiconductor chip in which a driving circuit for supplying a pixel voltage to a pixel electrode PE (see FIG. 3) is formed, for example, may be mounted on a front surface 12f of the substrate 12. A system for mounting a semiconductor chip on a glass substrate is referred to as a Chip on glass (COG) system. A part of the driving circuit may be formed in the frame region using an element simultaneously formed when an element for display is formed.

As illustrated in FIG. 3, the liquid crystal display device LCD1 includes a plurality of pixel electrodes PE arranged between the substrate 11 and the substrate 12 and a common electrode CE arranged between the substrates 11 and 12. The liquid crystal display device LCD1 according to the present embodiment is the display device in the horizontal electric field mode, as described above. Thus, each of the plurality of pixel electrodes PE and the common electrode CE is formed in the substrate 12.

In the substrate 12 illustrated in FIG. 3, a circuit mainly for image display is formed in a base material 12st composed of a glass substrate, etc. The substrate 12 includes the front surface 12f positioned on the side of the substrate 12 and a back surface 12b positioned on the opposite side thereof. An active element such as a Thin-Film Transistor (TFT) and the plurality of pixel electrodes PE are formed in a matrix shape on the side of the front surface 12f of the substrate 12. A substrate where the TFT is formed as an active element, e.g., the substrate 12 is referred to as a TFT substrate.

An example illustrated in FIG. 3 illustrates the liquid crystal display device LCD1 in the horizontal electric field mode (specifically, an FFS mode), as described above. Thus, each of the common electrode CE and the pixel electrodes PE is formed on the side of the front surface 12f of the substrate 12. The common electrode CE is formed on the side of a front surface of the base material 12st in the substrate 12, and is covered with an insulating layer OC2. The plurality of pixel electrodes PE are formed in the insulating layer OC2 on the side of the substrate 11 to oppose the common electrode CE via the insulating layer OC2.

The substrate 11 illustrated in FIG. 3 is a substrate in which a color filter CF, which forms an image for color display, is formed in a base material 11st composed of a glass substrate, etc. and has the front surface 11f on the side of the display surface and a back surface 11b positioned on the opposite side of the front surface 11f. The substrate having the color filter CF formed therein, e.g., the substrate 11 is referred to as an opposite substrate because it opposes the above-described TFT substrate via a color filter substrate or a liquid crystal layer when distinguished from the TFT substrate. A configuration in which the color filter CF is provided in the TFT substrate can also be used.

In the substrate 11, the color filter CF having color filter pixels CFr, CFg, and CFb in three colors, i.e., red (R), green (G), and blue (B) periodically arranged therein is formed on one surface of the base material 11st such as a glass substrate. In a color display device, sub-pixels in three colors, i.e., red (R), green (G), and blue (B) are used as one set, to constitute one pixel, for example. The plurality of color filter pixels CFr, CFg, and CFb in the substrate 11 are arranged at positions opposing respective sub-pixels having the pixel electrodes PE formed in the substrate 12.

Light shielding films BM are respectively formed in boundaries among the color filter pixels CFr, CFg, and CFb in the colors R, G, and B. The light shielding film BM is referred to as a black matrix, and is composed of black resin, for example. The light shielding film BM is formed in a lattice shape in a plan view. In other words, the substrate 11 includes the color filter pixels CFr, CFg, and C-b in the colors R, G, and B formed among the light shielding films BM formed in a lattice shape.

The substrate 11 has a resin layer OC1 covering the color filter CF. The light shielding films BM are respectively formed in the boundaries among the color filter pixels CFr, CFg, and CFb in the colors R, G, and B. Thus, an inner side surface of the color filter CF is an uneven surface. The resin layer OC1 functions as a flattening film for flattening the unevenness on the inner side surface of the color filter CF. Alternatively, the resin layer OC1 functions as a protective film for preventing impurities from being diffused into the liquid crystal layer from the color filter CF. The resin layer OC1 can harden a resin material by containing a component to be hardened by applying energy, i.e., a thermosetting resin component or a light hardening resin component in its material.

A liquid crystal layer LCL, in which a display image is formed when a voltage for display is applied between the pixel electrodes PE and the common electrode CE, is provided between the substrate 11 and the substrate 12. The liquid crystal layer LCL modulates light that passes therethrough depending on a state of an applied electric field.

The substrate 11 includes an oriented film AF1 covering the resin layer OC1 on the back surface 11b serving as an interface contacting the liquid crystal layer LCL. The substrate 12 has an oriented film AF2 covering an insulating layer OC2 and the plurality of pixel electrodes PE on the front surface 12f serving as an interface contacting the liquid crystal layer LCL. The oriented films AF1 and AF2 are resin films formed to make initial orientations of liquid crystals included in the liquid crystal layer LCL align, and are composed of polyimide resin, for example.

As illustrated in FIG. 4, the sealing section SL arranged to surround the liquid crystal layer LCL includes a sealing material SLp. The liquid crystal layer LCL is sealed into a region surrounded by the sealing material SLp. That is, the sealing material SLp functions as a sealing material for preventing the liquid crystal layer LCL from leaking out. The sealing material SLp adheres to each of the back surface 11b of the substrate 11 and the front surface 12f of the substrate 12. The substrate 11 and the substrate 12 are adhesively fixed to each other via the sealing material SLp. That is, the sealing material SLp functions as an adhesive member for adhesively fixing the substrates 11 and 12 to each other.

The thickness of the liquid crystal layer LCL illustrated in FIGS. 3 and 4 is significantly smaller than the thicknesses of the substrates 11 and 12. For example, the thickness of the liquid crystal layer LCL is approximately 0.1% to 10% of the thicknesses of the substrates 11 and 12. In an example illustrated in FIGS. 3 and 4, the thickness of the liquid crystal layer LCL is approximately 4 µm.

In the present embodiment, the sealing section SL includes a member PS arranged around the liquid crystal layer LCL and extending along an outer edge of the liquid crystal layer LCL, as illustrated in FIGS. 1 and 4. The member PS illustrated in FIGS. 1 and 4 can be formed in one or both of the substrates 11 and 12. An example in which the member PS is formed in the substrate 11 will be described below as a representative example.

The member PS functions as a spacer member for gap adjustment that defines a separation distance between the substrate 11 and the substrate 12 when the substrates 11 and 12 are adhesively fixed to each other in processes for manufacturing the liquid crystal display device LCD1.

In the processes for manufacturing the liquid crystal display device LCD1, the sealing material SLp is applied in a direction in which the member PS extends, and the substrate 11 and the substrate 12 are brought closer to each other in the process for adhesively fixing the substrates 11 and 12. At this time, the sealing material SLp is pushed out to both sides of the member PS. When the member PS adheres to the front surface 12f of the substrate 12 (the back surface 11b of the substrate 11 when the member PS is provided in the substrate 12), the separation distance between the substrates 11 and 12 is defined depending on the thickness of the member PS. If the substrates 11 and 12 are adhesively fixed to each other using this method, the sealing material SLp is adjacently arranged on both sides of the member PS, as illustrated in FIGS. 1 and 4.

A method for defining the separation distance between the substrate 11 and the substrate 12 includes a method other than that in the present embodiment. For example, there is a technique for mixing a glass fiber with the sealing material SLp instead of forming the member PS to adjust the separation distance depending on the thickness of the glass fiber. In a method for forming the member PS serving as the spacer member at a peripheral edge of the substrate 11 or 12, like in the present embodiment, the glass fiber need not be mixed with the sealing material SLp. Alternatively, an example of the present embodiment is preferable in terms of enabling the member PS to control the separation distance between the substrates 11 and 12 with high accuracy.

The member PS functions as a damping member for suppressing spreading of the oriented film AF1 to the peripheral edge of the substrate 11 on the back surface 11b of the substrate 11. If the member PS is used as a member for damping the oriented film AF1, as illustrated in FIG. 4, a part of the sealing material SLp overlaps the peripheral edge of the oriented film AF1 in the thickness direction on the inner side of the member PS in the substrate 11, i.e., on the side closer to the display section DP than the member PS. On the other hand, the oriented film AF1 does not spread to the outer side of the member PS in the substrate 11, i.e., to the side of the peripheral edge of the substrate 11. Thus, the other part of the sealing material SLp does not overlap the peripheral edge of the oriented film AF1 but adheres to the resin layer OC1 having the back surface 11b of the substrate 11 on the outer side of the member PS in the substrate 11, i.e., on the side of the peripheral edge of the substrate 11.

A method for displaying a color image by the liquid crystal display device LCD1 illustrated in FIG. 3 is as follows, for example. More specifically, light emitted from the light source LS is filtered by the polarizing plate PL2, and light passing through the polarizing plate PL2 is incident on the liquid crystal layer LCL. The light incident on the liquid crystal layer LCL is propagated in the thickness direction of the liquid crystal layer LCL (i.e., a direction directed toward the substrate 11 from the substrate 12) by changing a polarization state depending on refractive index anisotropy of a liquid crystal (i.e., birefringence), and is emitted from the substrate 11. At this time, liquid crystal orientation is controlled by an electric field formed by applying a voltage to the pixel electrodes PE and the common electrode CE, and the liquid crystal layer LCL functions as an optical shutter. That is, in the liquid crystal layer LCL, light transmissivity can be controlled for each sub-pixel. Light, which has reached the substrate 11, is subjected to color filtering processing (i.e., processing for absorbing light other than that having a predetermined wavelength) in the color filter CF formed in the substrate 11, and is emitted from the front surface 11f. The light emitted from the front surface 11f reaches a viewer VW via the polarizing plate PL1.

<Adhesive Strength of Sealing Section>

Figure 5:
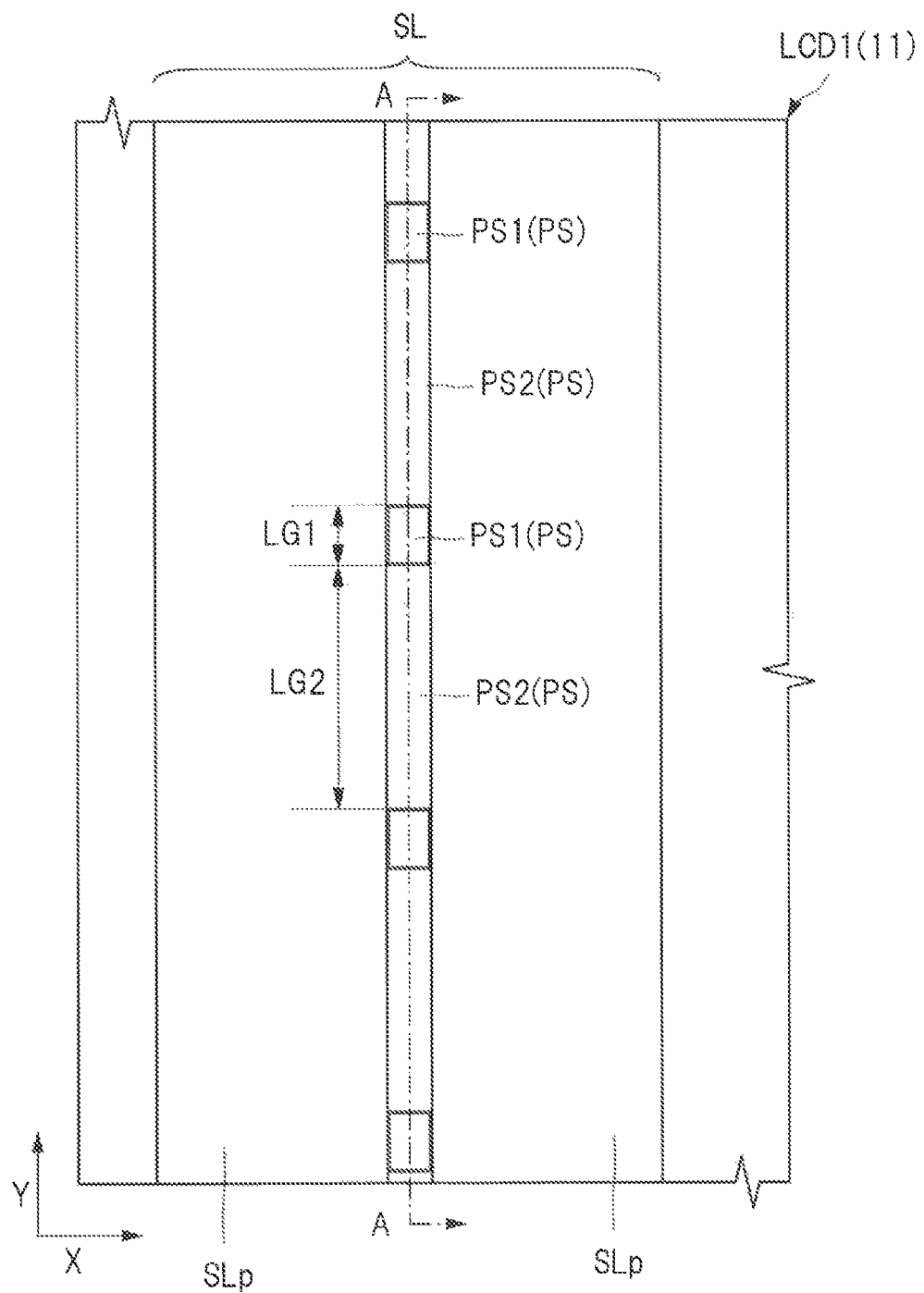
FIG. 5 is an enlarged plan view around a sealing section illustrated in FIG. 1.
Figure 6:
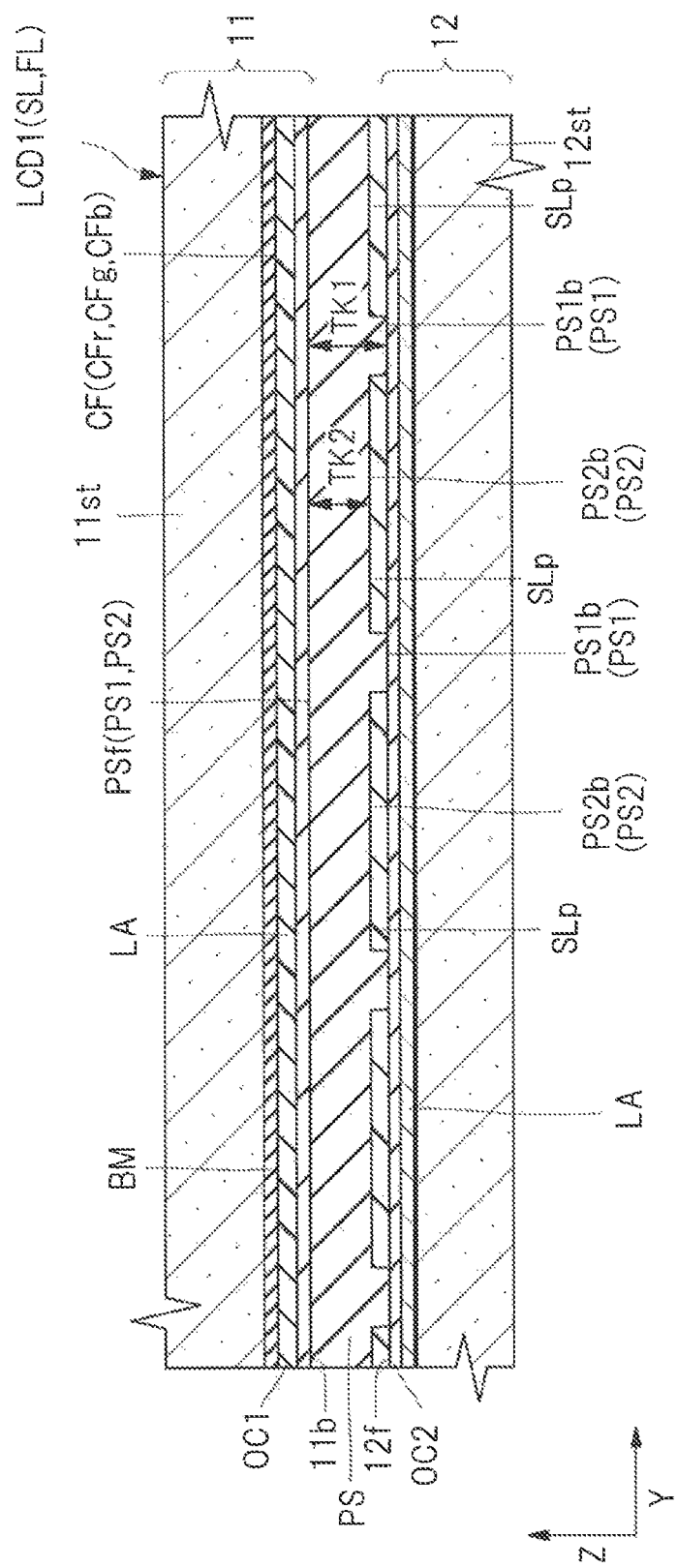
FIG. 6 is an enlarged sectional view taken along a line A-A illustrated in FIG. 5.
Figure 7:
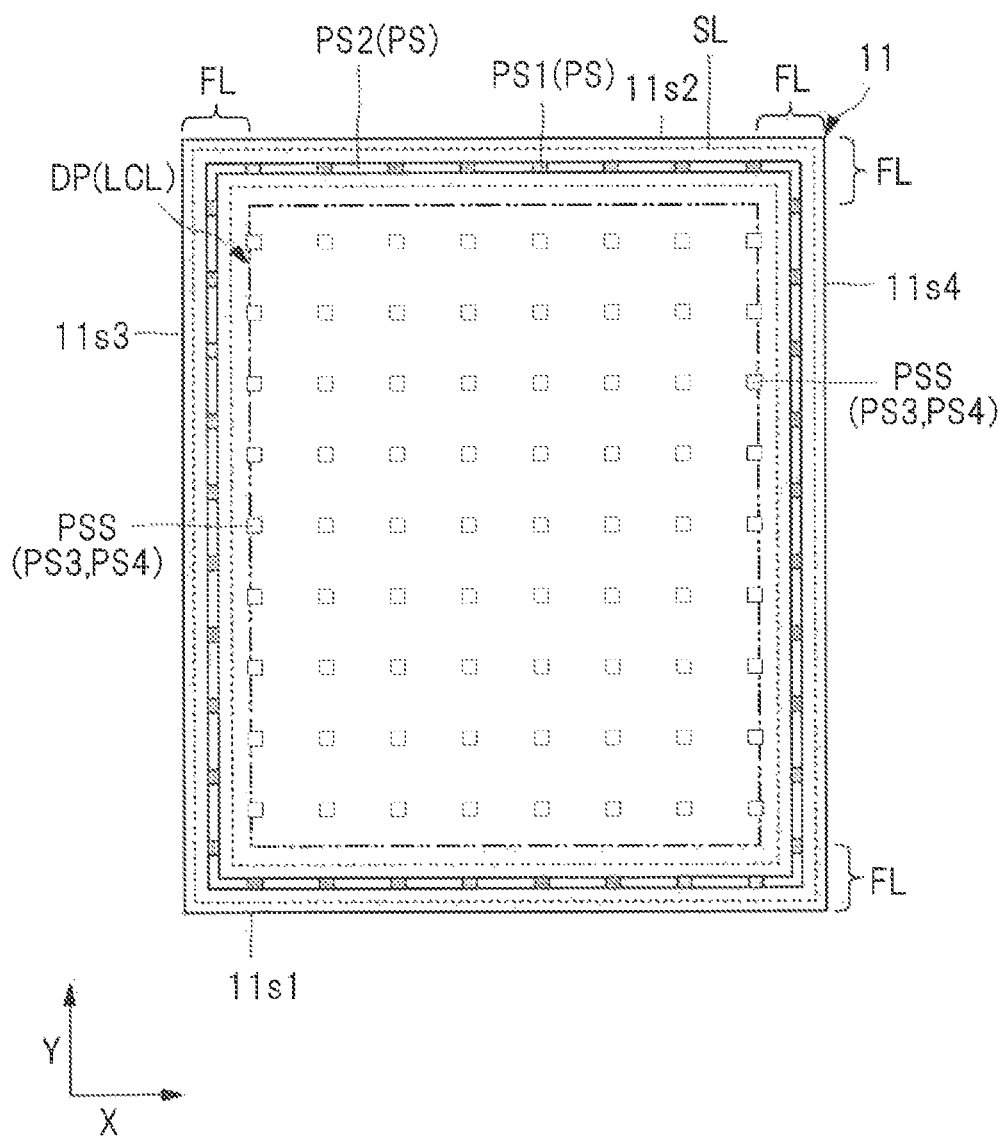
FIG. 7 is a plan view schematically illustrating a plurality of members formed on the side of a back surface of a color filter substrate illustrated in FIGS. 3 and 4.
Figure 12:
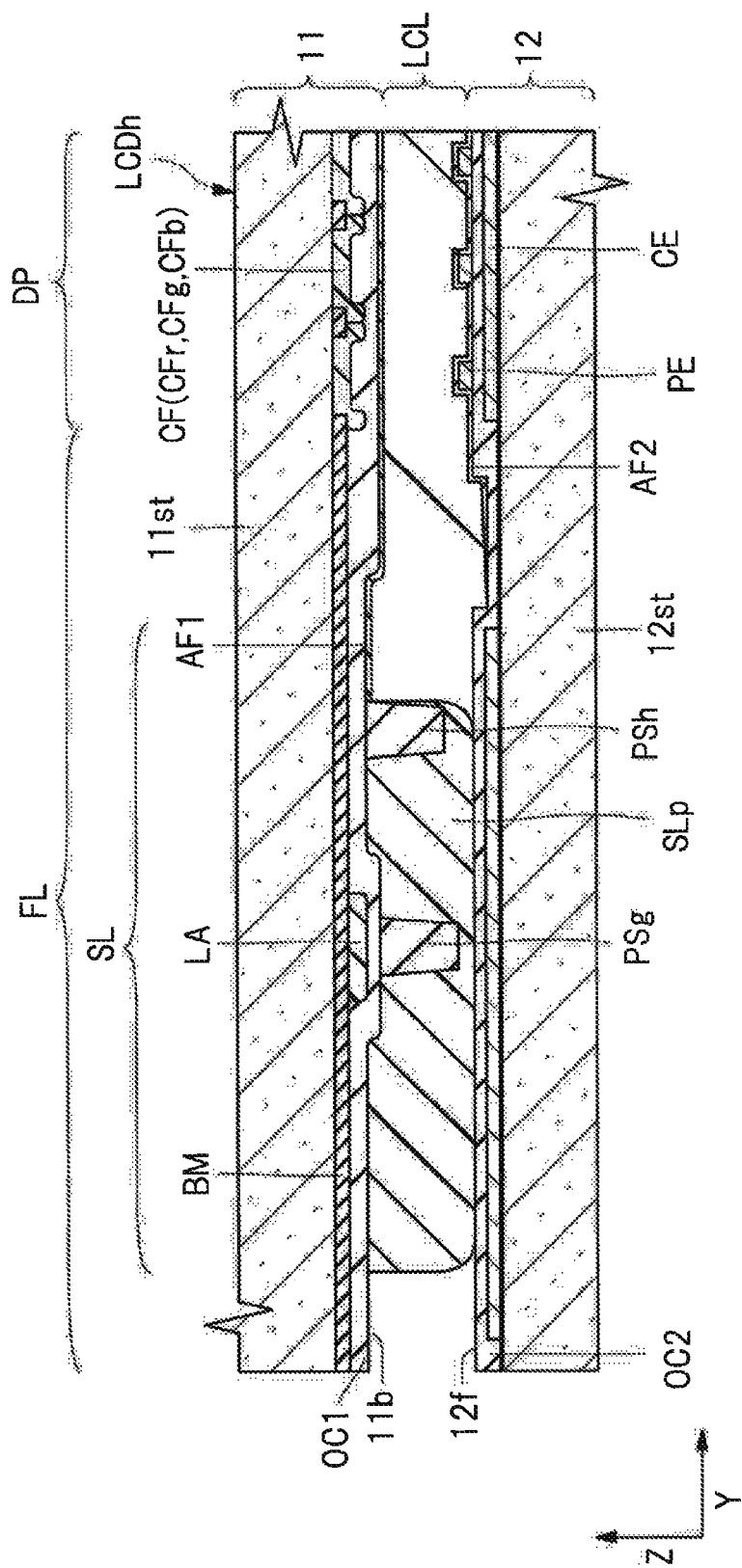
FIG. 12 is an enlarged sectional view illustrating another example of examination different from that illustrated in FIG. 4.

Adhesive strength in the sealing section SL illustrated in FIG. 4, i.e., sealing strength in the sealing section SL will be described below. FIG. 12 is an enlarged sectional view illustrating another example of examination different from that illustrated in FIG. 4. FIG. 5 is an enlarged plan view around the sealing section SL illustrated in FIG. 1. FIG. 6 is an enlarged sectional view taken along a line A-A illustrated in FIG. 5. FIG. 5 is an enlarged plan view of the member PSp formed in the substrate 11 illustrated in FIG. 4 as viewed from the substrate 12. FIG. 7 is a plan view schematically illustrating a plurality of members formed on the side of a back surface of the color filter substrate illustrated in FIGS. 3 and 4.

The sealing strength in the sealing section SL is defined by adhesive strength between components respectively formed in the substrate 11 and the substrate 12 and adhesive strength between the components and the sealing material SLp. Each of adhesive strength between the sealing material SLp and the oriented film AF1 and adhesive strength between the oriented film AF1 and the resin layer OC1 is lower than adhesive strength between the sealing material SLp and the resin layer OC1. Similarly, each of adhesive strength between the sealing material SLp and the oriented film AF2 and adhesive strength between the oriented film AF2 and the insulating layer OC2 is lower than adhesive strength between the sealing material SLp and the insulating layer OC2.

Therefore, an adhesion area between the sealing material SLp and the resin layer OC1 is preferably increased from the viewpoint of improving adhesive strength between the substrate 11 and the sealing material SLp. An adhesion area between the sealing material SLp and the insulating layer OC2 is preferably increased from the viewpoint of improving adhesive strength between the substrate 12 and the sealing material SLp.

The oriented films AF1 and AF2 are composed of a material having a high fluidity such as polyimide resin. Thus, the oriented films AF1 and AF2 easily spread to the periphery of the display section DP when formed to cover the entire display section DP. Therefore, a damping member PSh illustrated in FIG. 12 is preferably provided between the sealing section SL and the display section DP, from the viewpoint of increasing an adhesive area between the sealing material SLp and the insulating layer OC1. A liquid crystal display device LCDh illustrated in FIG. 12 includes a member PSg serving as a spacer member for gap adjustment that defines the separation distance between the substrate 11 and the substrate 12 and the damping member PSh for suppressing spreading of the oriented film AF1. The damping member PSh is formed between the member PSg and the display section DP. If a great distance can be ensured between the sealing section SL and the display section DP, the damping member PSh is provided between the sealing section SL and the display section DP, so that the adhesion area between the sealing material SLp and the resin layer OC1 can be maximized.

An approach to reducing the area of the frame section FL provided around an effective display region has been examined from the viewpoint of improving the design of the display device, miniaturizing the display device, or making the display device lightweight. That is, there is a request for a technique for reducing the area of the frame section FL illustrated in FIG. 1 and increasing an area occupied by the display section DP in a plan view.

As illustrated in FIG. 1, the sealing section SL is formed in the frame section FL. Thus, if the area of the frame section FL decreases, a distance between the sealing section SL and the display section DP decreases. When the damping member PSh is provided, like in the liquid crystal display device LCDh illustrated in FIG. 12, a position where the damping member PSh is formed overlaps with the sealing section SL.

If the damping member PSh is provided in the sealing section SL, the damping member PSh inhibits spreading of the sealing material SLp when the sealing material SLp is pushed out. If the sealing material SLp does not sufficiently spread, the member PSg does not contact the front surface 12f of the substrate 12, so that the thickness of the liquid crystal layer LCL may not be stabilized, as illustrated in FIG. 12. If the thickness of the liquid crystal layer LCL is not stabilized and becomes non-uniform in a plan view, positions of the color filter CF and the pixel electrodes PE may deviate from each other. When the sealing material SLp insufficiently spreads, an adhesion area between the sealing material SLp and the substrate 11 or between the sealing material SLp and the substrate 12 may be decreased.

The inventors of the present application have made examination in view of the above-mentioned problems, to find out a configuration of the liquid crystal display device LCD1 described in the present embodiment. More specifically, in the liquid crystal display device LCD1 according to the present embodiment, the member PS formed in the sealing section SL functions as both a spacer member for gap adjustment that defines the separation distance between the substrate 11 and the substrate 12 and a member for damping the oriented film AF1. Thus, the sealing material SLp and the oriented film AF1 may overlap each other in the thickness direction in the region closer to the display section DP than the member PS, as illustrated in FIG. 4.

However, at least the member PS damps the oriented film AF1. Thus, the oriented film AF1 does not spread to the outer side of the member PS, i.e., to the opposite side of the display section DP as viewed from the member PS. If the sealing material SLp can be reliably pushed out to the outer side of the member PS, the sealing material SLp and the resin layer OC1 can be made to adhere to each other outside the sealing material SLp.

If the sealing material SLp can be made to firmly adhere to the substrate 11 and the substrate 12 outside the member PS, like in the present embodiment, required adhesive strength can be ensured even if the sealing material SLp and the oriented film AF1 overlap each other in the thickness direction inside the member PS. That is, if the sealing material SLp can be stably pushed out to both the sides of the member PS, required adhesion strength can be ensured.

As illustrated in FIGS. 5 and 6, the member PS in the present embodiment includes a plurality of portions PS1 having a height (thickness) TK1 (see FIG. 6) and a plurality of portions PS2 having a height (thickness) TK2 smaller than the height TK1.

In an example illustrated in FIGS. 5 and 6, each of the plurality of portions PS2 is arranged between the adjacent portions PS1. In other words, each of the plurality of portions PS1 is arranged between the adjacent portions PS2. The plurality of portions PS1 and the plurality of portions PS2 are alternately arranged in a direction in which the member PS extends.

In the present embodiment, the member PS is formed in the substrate 11. Thus, respective front surfaces PSf, on the side of the base material 11st, of the portion PS1 and the portion PS2 are formed at the same height, i.e., flat surfaces. On the other hand, a back surface PS1b on the side of the substrate 12 of the portion PS1 and a back surface PS2b on the side of the substrate 12 of the portion PS2 are formed at different heights. More specifically, in the thickness direction of the liquid crystal display device LCD1, the back surface PS1b on the side of the substrate 12 of the portion PS1 is formed at a position closer to the substrate 12 than the back surface PS2b on the side of the substrate 12 of the portion PS2.

In the example illustrated in FIG. 6, the back surface PS1b of each of the plurality of portions PS1 contacts the front surface 12f of the substrate 12. On the other hand, the back surface PS2b of each of the plurality of portions PS2 does not contact the front surface 12f of the substrate 12.

As a result, a clearance is formed between the back surface PS2b of the portion PS2 and the front surface 12f of the substrate 12. In the processes for manufacturing the liquid crystal display device LCD1, when the sealing material SLp is pushed out, a clearance between the back surface PS2b and the front surface 12f functions as a passage for making the inner side (i.e., the side of the display section DP) and the outer side of the member PS illustrated in FIG. 4 communicate with each other. The member PS is thus provided with the passage for making the sealing material SLp flow, so that the sealing material SLp can be stably pushed out.

The plurality of portions PS1 are formed in the member PS. Thus, when the substrate 12 and the substrate 11 are pressed against each other, the front surface 12f of the substrate 12 contacts each of the portions PS1. If the height TK1 of each of the plurality of portions PS1 is formed depending on the design thickness of the liquid crystal layer LCL illustrated in FIG. 4, therefore, the thickness of the liquid crystal layer LCL can be stably controlled.

When the oriented film AF1 illustrated in FIG. 4 is formed, if a function as a damping member for suppressing spreading of the oriented film AF1 is considered, the member PS preferably has a height not exceeded by the oriented film AF1. Therefore, as long as the front surface PSf of the portion PS2 illustrated in FIG. 6 adheres to the resin layer OC1, the back surface PS2b may have a height lower than that of the back surface PS1b of the portion PS1.

If a clearance is formed between the portion PS1 and the portion PS2 in a plan view, the oriented film AF1 may get over the member PS from the clearance. Therefore, from the viewpoint of preventing of spreading of the oriented film AF1, the plurality of portions PS1 and the plurality of portions PS2 are preferably respectively connected to each other such that no clearance occurs between the portion PS1 and the PS2 in a plan view.

As described above, the portion PS1 in the member PS is mainly provided as the spacer member for gap adjustment that defines the separation distance between the substrate 11 and the substrate 12. Thus, when the substrates 11 and 12 are pressed against each other, such strength that the portion PS1 is not damaged is preferably to be ensured. Therefore, if the plurality of portions PS1 are provided, the respective areas of the back surfaces PS1 of the plurality of portions PS1 can be reduced.

On the other hand, a function as the above-mentioned spacer member for gap adjustment is not required for the portions PS2 in the member PS. From the viewpoint of increasing a cross-sectional area of a passage for making the inner side (i.e., the side of the display section DP) and the outer side of the member PS illustrated in FIG. 4 communicate with each other to improve the fluidity of the sealing material SLp, the respective lengths of the plurality of portions PS2 in a direction perpendicular to the direction in which the sealing material SLp flows are preferably increased.

Therefore, in the present embodiment, as illustrated in FIG. 5, the respective lengths LG1 of the plurality of portions PS1 in a direction in which the member PS extends (a Y-direction in the example illustrated in FIG. 5) are smaller than the respective lengths LG2 of the plurality of portions PS2 in the direct ion in which the member PS extends. Thus, when the sealing material SLp is pushed out, the fluidity of the sealing material SLp can be improved.

When the length LG2 of the portion PS2 increases, the separation distance between the adjacent portions PS1 increases. In this case, when the substrate 12 and the portion PS1 in the member PS contact each other, the periphery of a portion, opposing the portion PS2, of the substrate 12 is easily deflected. Therefore, the length LG2 of the portion PS2 is preferably decreased from the viewpoint of suppressing the deflection occurring in the substrate 12.

In an example specifically examined by the inventors of the present invention, if a distance between the centers of the adjacent portions PS1, i.e., if the sum of the length LG1 and the length LG2 is set to 100 μm, the length LG1 illustrated in FIG. 5 is set to approximately 5 μm to 30 μm, so that the deflection occurring in the substrate 12 is suppressed and the fluidity of the sealing material SLp can be improved. The above-described numerical value changes in proportion to the plane area of the liquid crystal display device LCD1. However, a value obtained by dividing the length LG1 by the sum of the lengths LG1 and LG2 is preferably not less than 5% and not more than 30%.

If the substrate 12 is deflected, a difference in height between the back surface PS1b of the portion PS1 and the back surface PS2b of the portion PS2 illustrated in FIG. 6 is preferably decreased from the viewpoint of suppressing damage to components of the substrate 12 after the deflection is increased. In the example illustrated in FIG. 6, for example, a difference in height between the back surface PS1b of the portion PS1 and the back surface PS2b of the portion PS2 is approximately 25% of the thickness of the portion PS1. If the thickness of the portion PS1 is approximately 2 μm, for example, a difference in height between the back surface PS1b and the back surface PS2b is approximately 0.4 μm.

If the difference in height between the back surface PS1b of the portion PS1 and the back surface PS2b of the portion PS2 is less than the half of the thickness of the portion PS1, and is particularly preferably 25% or less, even if the substrate 12 is deflected, an increase in an amount of the deflection can be suppressed because the substrate 12 is supported by the back surface PS2b of the portion PS2.

The display section DP preferably includes a plurality of spacer members PSS, as schematically illustrated in FIG. 7, from the viewpoint of suppressing the deflection of the substrate 12. The plurality of spacer members PSS include a spacer member PS3 having the same height (i.e., the same thickness) as that of the portion PS1 in the member PS and a spacer member PS4 having the same height (i.e., the same thickness) as that of the portion PS2. When the plurality of spacer members PSS are provided in the display section DP in the substrate 11, for example, the substrate 12 is supported by the spacer member PS3 in addition to the portion PS1 in the member PS in the process for adhesively fixing the substrate 11 and the substrate 12. Even if the substrate 12 is deflected, an increase in an amount of the deflection can be suppressed because the substrate 12 is supported by the portion PS2 in the member PS and the spacer member PS4.

The number of spacer members PSS may be determined depending on the size of the liquid crystal display device LCD1. The respective planar sizes of the plurality of spacer members PSS may be substantially the same as that of the portion PS1 in the member PS, for example. The plurality of spacer members PSS can be formed in a dispersed manner in the display section DP, which does not become a factor inhibiting application of the oriented film AF1 and the liquid crystal layer illustrated in FIGS. 3 and 4. Even if some of the plurality of spacer members PSS are formed at positions overlapping the sealing section SL in the frame section FL, for example, the fluidity of the sealing material SLp (see FIG. 4) is not easily inhibited.

The spacer member PSS is formed of a resin material transparent to visible light. Thus, even if the plurality of spacer members PSS are formed in the display section DP, the spacer members PSS do not easily cause disturbance of a display image. The spacer members PSS are formed of the same member as the member PS, for example. When the member PS is formed, the plurality of spacer members PSS can be collectively formed.

As described above, in the present embodiment, the member PS is formed in the substrate 11. Spreading of the oriented film AF2 formed in the substrate 12, as illustrated in FIG. 4, is suppressed by a structure described below, for example. More specifically, in an insulating layer OC2 of the substrate 12, a groove TR1 extending in a direction in which the sealing section SL extends is formed between the sealing section SL and the display section DP. The substrate 12 is a substrate on the opposite side of the display surface. Thus, the light shielding film BM need not be formed in the frame section FL. Therefore, the deep groove TR1 is easier to form in the insulating layer OC2 than in the resin layer OC1 in the substrate 11. If the deep groove TR1 can be formed in the insulating layer OC2, spreading of the oriented film AF2 is easily stopped within the groove TR1, as illustrated in FIG. 4.

On the other hand, in the case of the substrate 11, the light shielding film BM needs to be provided in the frame section FL. If the groove TR1 is formed in the resin layer OC1, the thickness of the light shielding film BM needs to be considered. Thus, the depth of the groove TR1 becomes smaller than when the groove TR1 is formed in the substrate 12. Therefore, in the substrate 11, spreading of the oriented film AF1 is more advantageously suppressed by forming the member PS.

As a modification example of the present embodiment, there is an example in which the member PS is formed in the substrate 12. If the member PS is formed in both the substrate 11 and the substrate 12, the flow of the sealing material SLp may be inhibited by the member PS formed in each of the substrates 11 and 12 when the sealing material is pushed out. Therefore, if the member PS is formed in the substrate 1, spreading of the oriented film AF1 is preferably suppressed by not forming the member PS in the substrate 11 but forming the groove TR1 illustrated in FIG. 4. If spreading of the oriented film AF1 is suppressed by forming the groove TR1 in the resin layer OC1 in the substrate 11, the resin layer OC1 is preferably made thick.

<Method for Manufacturing Display Device>

Figure 8:
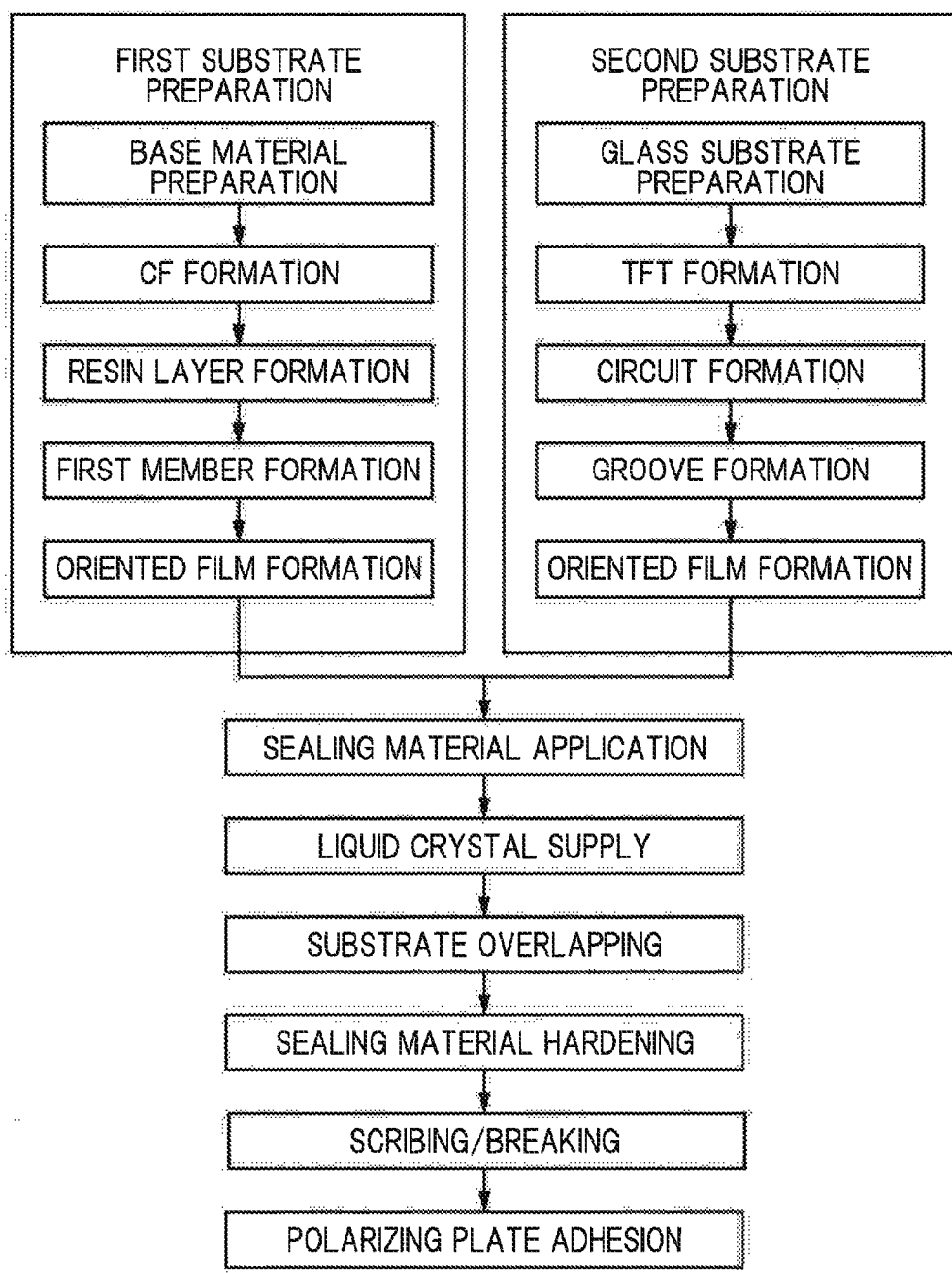
FIG. 8 is an assembly flow illustrating the outline of processes for manufacturing the liquid crystal display device illustrated in FIG. 1.

A method for manufacturing the display device described in the present embodiment will be described below. In the following description, a method for manufacturing the liquid crystal display device LCD1 illustrated in FIG. 1 will be described as a representative example. FIG. 8 is an assembly flow illustrating the outline of the processes for manufacturing the liquid crystal display device LCD1 illustrated in FIG. 1. Detailed members referred to in the following description will be described by referring to FIGS. 1 to 7, described above, as needed.

As illustrated in FIG. 8, the method for manufacturing the display device according to the present embodiment includes a first substrate preparation process for preparing the substrate 11 illustrated in FIG. 3 and a second substrate preparation process for preparing the substrate 12 illustrated in FIG. 3. The method of manufacturing the display device according to the present embodiment includes a sealing material application process, a liquid crystal supply process, a substrate overlapping process, a sealing material hardening process, and a scribing/breaking process.

In the first substrate preparation process illustrated in FIG. 8, the color filter substrate corresponding to the substrate 11 illustrated in FIGS. 3 and 4 is prepared. In the first substrate preparation process, the base material 11*st* composed of a glass substrate, for example, is prepared (a base material preparation process). After the base material preparation process, the light shielding film BM and the plurality of color filters CF are formed on one surface of the base material 11*st* (a CF formation process). The light shielding film BM is also formed in not only the display section DP, in but also the frame section FL, as illustrated in FIG. 4. In this process, a member IA may be further formed on the light shielding film BM at a position, which overlaps the member PS in the thickness direction, of the sealing section SL, as illustrated in FIGS. 4 and 6. The member LA is a height adjustment member for adjusting the height of the resin layer OC1 at a position where the member PS is formed. The member LA can be formed of the same resin material as that of the color filter CF, for example.

After the CF formation process, the resin layer OC1 is formed to cover the plurality of color filters CF (a resin layer formation process). The color filters CF and the light shielding film BM are covered with the resin layer OC1, so that the color filters CF and the light shielding film BM are protected. When the resin layer OC1 is formed to cover the color filters CF, the back surface 11*b* of the substrate 11 can be flattened.

After the resin layer formation process, the member PS is formed (a first member formation process). The member PS can be formed through a photolithography process including an exposure process and a removal process for chemically removing an unnecessary portion, similarly to the color filters CF and the light shielding member BM. If portions PS1 and portions PS2, which differ in height, are formed like in the member PS, a method for performing exposure a plurality of times may be used. If a plurality of masks, which differ in light permeability, are stacked on a region where the member PS is formed before the exposure process, and the exposure process is then implemented, the portions PS1 and the portions PS2, which differ in height, can be collectively formed by performing the exposure process only once. According to this method, the spacer member PS3 and the spacer member PS4, which differ in height, can be collectively formed on the display section DP illustrated in FIG. 7 by performing exposure process only once. According to the above-mentioned method, the spacer member PSS and the member PS illustrated in FIG. 7 can be collectively formed.

After the first member formation process, the oriented film AF1 is formed on the side of the back surface 11b of the substrate 11 (a oriented film formation process). In the oriented film formation process, after polyimide resin serving as a raw material for the oriented film AF1, for example, is applied, the oriented film AF1 can be formed by rubbing processing. The rubbing processing may be replaced with a photo-alignment method for irradiating a polymer film with ultraviolet rays and selectively reacting a polymer chain in a polarization direction to form the oriented film AF1.

A method for applying the polyimide resin can include a screen printing system or an inkjet system, for example. If the polyimide resin is applied using the inkjet system, the oriented film AF1 more easily spreads therearound than using the screen printing system. However, according to the present embodiment, the member PS is formed to surround the periphery of the display section DP, as illustrated in FIG. 1, before the oriented film format ion process. Thus, spreading of the oriented film AF1 to the outer side of the member PS can be suppressed.

As described above, according to the present embodiment, an example in which no electrode and wiring are formed in the substrate 11 will be described. However, if an electrode and a wiring are formed in the substrate 11 as a modification example, the electrode is formed in the first substrate preparation process illustrated in FIG. 8. A timing at which the electrode is formed includes various timings. However, the electrode is preferably formed before the first member formation process, from the viewpoint of forming the portions PS1 in the member PS with high accuracy.

In the second substrate preparation process illustrated in FIG. 8, the TFT substrate corresponding to the substrate 12 illustrated in FIGS. 3 and 4 is prepared. In the second substrate preparation process, the base material 12st composed of a glass substrate, for example, is first prepared (a glass substrate preparation process). After the glass substrate preparation process, the TFT serving as a thin film having a plurality of transistors serving as active elements is formed on one surface of the base material 12st (a TFT formation process).

After the TFT formation process, a wiring electrically connected to the TFT and the common electrode CE and the pixel electrodes PE illustrated in FIG. 3 are formed (a circuit formation process). The common electrode CE and the pixel electrodes PE are formed of a transparent electrode material such as indium tin oxide (ITO). In the example illustrated in FIG. 3, after the common electrode CE is formed, the insulating layer OC2 is formed to cover the common electrode CE, and the plurality of pixel electrodes PE are further formed on the insulating layer OC2. In this process, the member LA may be formed at a position, which overlaps the member PS in the thickness direction, of the sealing section SL, as illustrated in FIGS. 4 and 6. The member LA is a height adjustment member for adjusting the height of the resin layer OC2 at a position where the member PS is formed. The member LA can be formed of the same material such as ITO as that for the common electrode CE, for example.

If the groove TR1 is formed between the display section DP and the sealing section SL in the substrate 12, as illustrated in FIG. 4, the groove TR1 is formed after the circuit formation process illustrated in FIG. 8, for example (a groove formation process). In this process, a part of the insulating layer OC2 is removed in a direction in which the sealing section SL extends, for example, to form the groove TR1. However, if the member IA is formed in the substrate 12, as illustrated in FIG. 4, the insulating layer OC2 is formed in accordance with a shape of the member LA. Therefore, a position of the groove TR1 and its depth can be adjusted to some extent by adjusting a position where the member LA is formed and its height. If the depth of the groove TR1 can be set to a sufficient depth even if a part of the insulating layer OC2 is not removed, as described above, the groove TR1 can be formed when the insulating layer OC2 is formed. Thus, this process can be omitted.

After the groove formation process, the oriented film AF2 is formed on the side of the front surface 12f of the substrate 12 (an oriented film formation process). In the oriented film formation process, after polyimide resin serving as a raw material for the oriented film AF2, for example, is applied, the oriented film AF2 can be formed by rubbing processing. The rubbing processing may be replaced with a photo-orientation method for irradiating a polymer film with ultraviolet rays and selectively reacting a polymer chain in a polarization direction to form the oriented film AF2.

Figure 9:
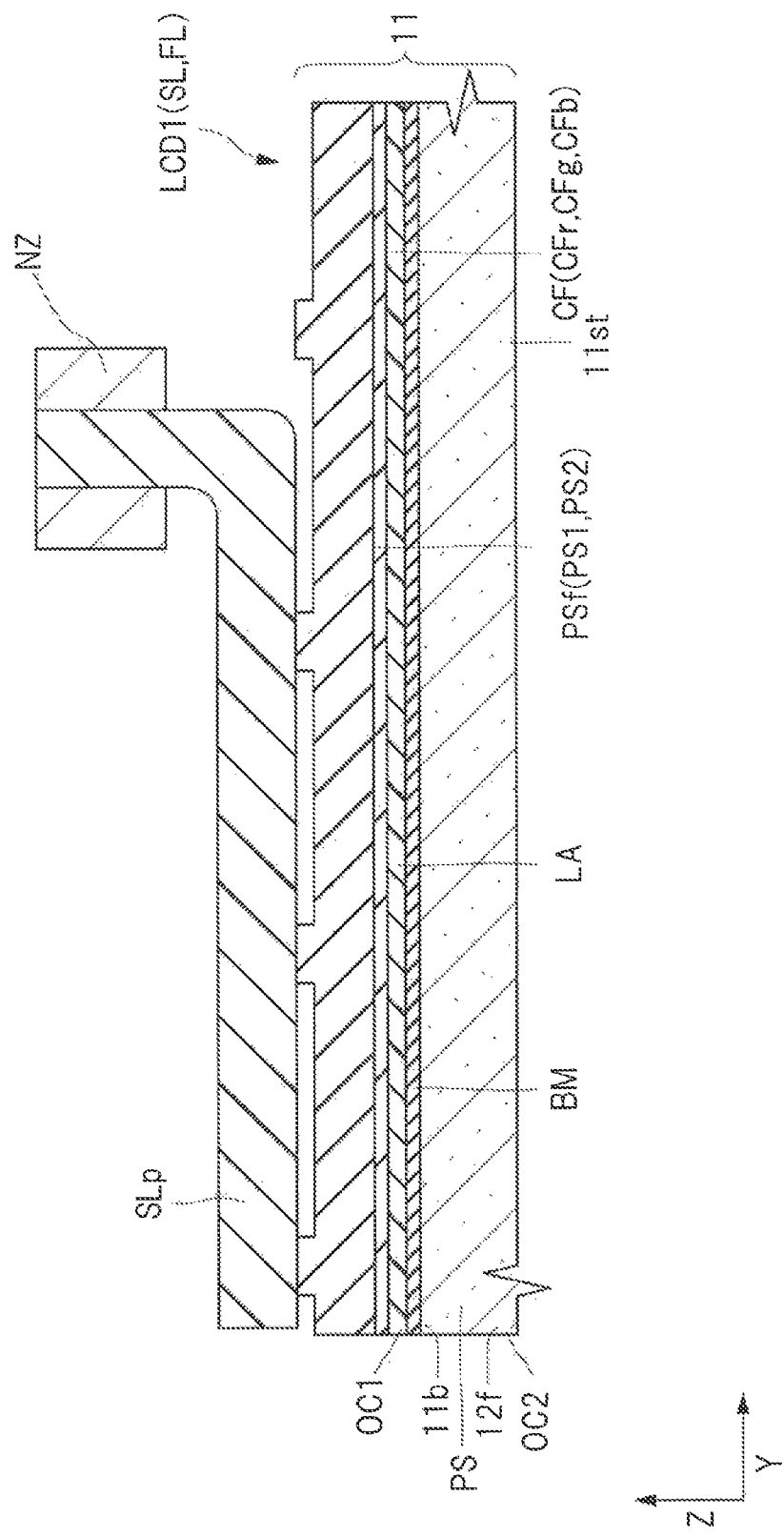
FIG. 9 is an enlarged sectional view illustrating a state where a paste-shaped sealing material is applied while being discharged from a nozzle in a sealing material application process illustrated in FIG. 8.

In the sealing material application process illustrated in FIG. 8, the sealing material SLp illustrated in FIG. 3 is applied to surround the periphery of the display section DP in the substrate 11 or the substrate 12. At this time, as illustrated in FIG. 9, a nozzle NZ is moved in the direction in which the member PS extends while discharging the paste-like sealing material SLp from the nozzle NZ. In the present embodiment, in the substrate overlapping process illustrated in FIG. 8, the sealing material SLp can be made to flow across the member PS. Thus, a margin in application position accuracy in this process can be widened.

In the liquid crystal supply process illustrated in FIG. 8, a liquid crystal is dropped such that the display section DP in the substrate 11 or the substrates 12 is filled therewith.

In the substrate overlapping process illustrated in FIG. 8, the substrate 11 and the substrate 12 are overlapped such that the back surface 11b of the substrate 11 and the front surface 12f of the substrate 12 oppose each other, as illustrated in FIG. 3. At this time, the plurality of pixel electrodes PE formed in the substrate 12 and the plurality of color filters CF in the substrate 11 are respectively overlapped to oppose each other.

In this process, when the substrate 11 and the substrate 12, which are arranged to oppose each other, are pressed against each other in a direction in which a distance therebetween decreases, the sealing material SLp flows to spread to both sides of the member PS, as illustrated in FIG. 4. In the present embodiment, the sealing material SLp and the resin layer OC1 are made to adhere to each other outside the member PS, thereby improving adhesive strength between the substrate 11 and the sealing material SLp. Therefore, it is important to make the sealing material SLp reliably flow to the outer side of the member PS.

According to the present embodiment illustrated in FIG. 4, a member, which inhibits the fluidity of the sealing material SLp, is not formed in the sealing material SLp. Thus, the sealing material SLp is easily made to flow to the outer side of the member PS. As illustrated in FIG. 6, according to the present embodiment, a clearance is formed between the back surface PS2b of the portion PS2 and the front surface 12f of the substrate 12 in the member PS. Therefore, if an amount of the sealing material SLp, which has been applied to the inner side of the portion PS2, is large, a part of the sealing material SLp is easily extruded to the outer side of the member PS via the clearance with pressure. As a result, the sealing material SLp easily flows to the outer side of the member PS.

According to the present embodiment, a member, which inhibits the fluidity of the sealing material SLp, is not formed in a region, closer to the display section DP than the member PS, of the sealing section SL. Therefore, the portion PS1 in the member PS and the front surface 12*f* of the substrate 12 are easily brought into contact with each other. As a result, the thickness of the liquid crystal layer LCL can be controlled with high accuracy.

In the sealing material hardening process illustrated in FIG. 8, energy is added to the sealing material SLp illustrated in FIG. 3, to harden the sealing material SLp. If the sealing material SLp is hardened, the substrate 11 and the substrate 12 are adhesively fixed to each other via the sealing material SLp. Energy for hardening the sealing material SLp includes heat energy or light energy such as ultraviolet energy.

A method for collectively forming a plurality of products in a large-sized base material and finally individualizing the products is preferable from the viewpoint of improving manufacturing efficiency of the liquid crystal display device LCD1. In this case, in the scribing/breaking process illustrated in FIG. 8, a cutting area of the substrate 11 or the substrate 12 is cut, to individualize the cutting area into a plurality of products. Thus, a contour shape of the liquid crystal display device LCD1 illustrated in FIG. 1 is obtained. At this time, an end surface of the substrate 11 positioned outside the substrate 12 (i.e., a side surface arranged at its peripheral edge) in a plan view is preferably subjected to polishing processing.

In a polarizing plate adhesion process illustrated in FIG. 8, the polarizing plate PL1 and the polarizing plate PL2 illustrated in FIG. 2 are respectively affixed to the front surface 11*f* of the substrate 11 and the back surface 12*b* of the substrate 12 via adhesive layers, and they are respectively adhesively fixed to the substrate 11 and the substrate 12.

In the foregoing processes, the liquid crystal display device LCD1 (excluding the light source LS) illustrated in FIG. 3 is obtained. Then, the obtained liquid crystal display device LCD1 is incorporated into a housing (not illustrated), to complete the display device with the housing. The light source LS illustrated in FIG. 2 can previously be incorporated into the housing.

Modification Examples

Of the modification examples according to the present embodiment described above, representative modification examples will be described below.

In the above-mentioned embodiment, the liquid crystal display device in the horizontal electric field mode has been described as an example of the liquid crystal display device. However, the technique described in the above-mentioned embodiment is also applicable to a liquid crystal display device in a vertical electric field mode such as a TN mode or a VA mode. In the liquid crystal display device in the vertical electric field mode, a pixel electrode PE or a common electrode CE, as illustrated in FIG. 3, is formed in a substrate 11 on the side of a display surface. In this case, as illustrated in FIG. 10 that is a modification example of FIG. 7, a substrate 11A has a terminal section TM provided further outside a frame section FL in a plan view.

Figure 10:
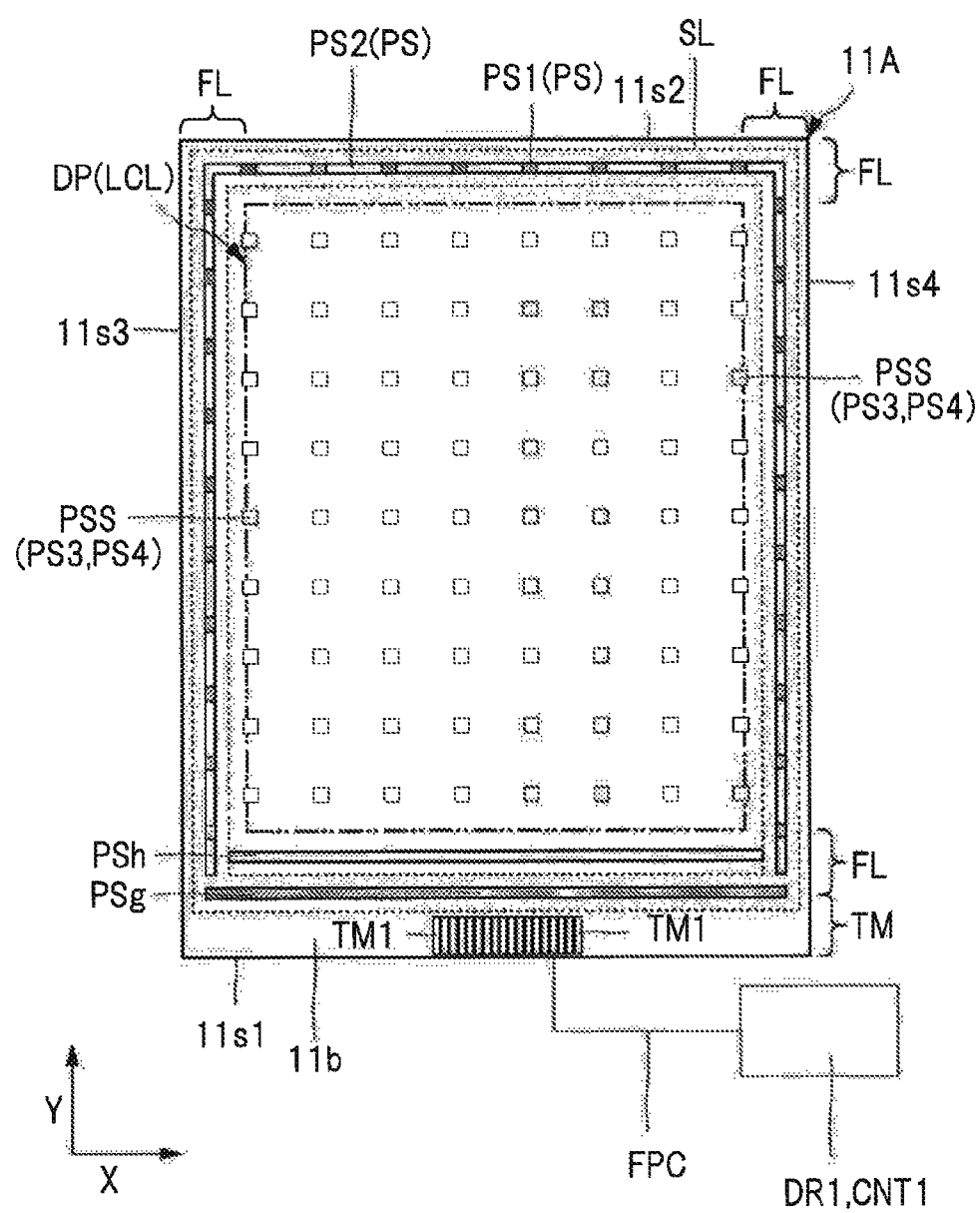
FIG. 10 is a plan view illustrating a modification example of FIG. 7.

Each of the substrate 11 illustrated in FIG. 7 and the substrate 11A illustrated in FIG. 10 has a side 11*s*1 extending in an X-direction, a side 11*s*2 opposing the side 11*s*1, a side 11*s*3 extending in a Y-direction perpendicular to the X-direction, and a side 11*s*4 opposing the side 11*s*3, in a plan view.

In the case of the substrate 11 illustrated in FIG. 7, respective distances from the sides 11*s*1, 11*s*2, 11*s*3, and 11*s*4 of the substrate 11 to the display section DP are substantially the same.

On the other hand, the terminal section TM in the substrate 11A illustrated in FIG. 10 is provided along the side 11*s*1 among the four sides of the substrate 11A, and the terminal section TM is not formed in the other sides 11*s*2, 11*s*3, and 11*s*4. Thus, in the case of the substrate 11A, a distance from the side 11*s*1 to the display section DP is longer than a distance from each of the other sides 11*s*2, 11*s*3, and 11*s*4 to the display section DP.

As illustrated in FIG. 10, in the side 11*s*1 having a relatively long distance to the display section DP, a position of a sealing section SL can be separated from the display section DP. As described in the above-mentioned embodiment, one of causes from which spreading of a sealing material SLp, as illustrated in FIG. 4, is inhibited is that a distance between the sealing section SL and the display section DP is short, as described with reference to FIG. 12. That is, if the distance between the sealing section SL and the display section DP is short, as illustrated in FIG. 12, when a member PSg for gap adjustment that defines a separation distance between the substrate 11 and the substrate 12, and a damping member PSh for suppressing spreading of an oriented film AF1 are formed side by side, the damping member PSh easily inhibits spreading of the sealing material SLp.

In the case of the substrate 11A provided with the terminal section TM, as in the modification example illustrated in FIG. 10, the member PSg for gap adjustment is formed along the sealing section SL for the side 11*s*1 on which the terminal section TM extends, and the damping member PSh can be arranged between the member PSg and the display unit DP.

The modification example illustrated in FIG. 10 can also be represented as follows. More specifically, members PS in the substrate 11A are respectively formed to extend along the sides 11*s*2, 11*s*3, and 11*s*4 among the four sides of the substrate 11A. The member PS is not formed on the side 11*s*1 provided with the terminal section TM. The member PSg for gap adjustment having the same height as that of a portion PS1 in the member PS is formed in a part, between the side 11*s*1 and the display section DP, of the sealing section SL continuously surrounding the periphery of the display section DP. The member PSg is formed to extend along the side 11*s*1. The damping member PSh for suppressing spreading of the oriented film AF1 (see FIG. 3) is formed between the sealing section SL and the display section DP. The damping member PSh has the same height as that of a portion PS2 in the member PS.

As a further modification example of FIG. 10, spreading of the oriented film AF1 may be suppressed by forming a groove TR1 (see FIG. 4) extending along the side 11*s*1 between the member PSg and the display section DP.

In the example illustrated in FIG. 10, an example in which the terminal section TM is provided is taken as an example in which respective distances between some of the four sides of the substrate 11A and the display section DP are separated from each other. Even if the terminal section TM is not provided, however, if the substrate 11A has the side 11*s*1 having a relatively long distance to the display section DP, the member PS need not be provided in a portion along the side 11s1. Even if the substrate 11A has the side 11s1 having a relatively long distance to the display section DP, it is needless to say that the member PS may be provided to extend along each of the four sides.

Figure 11:
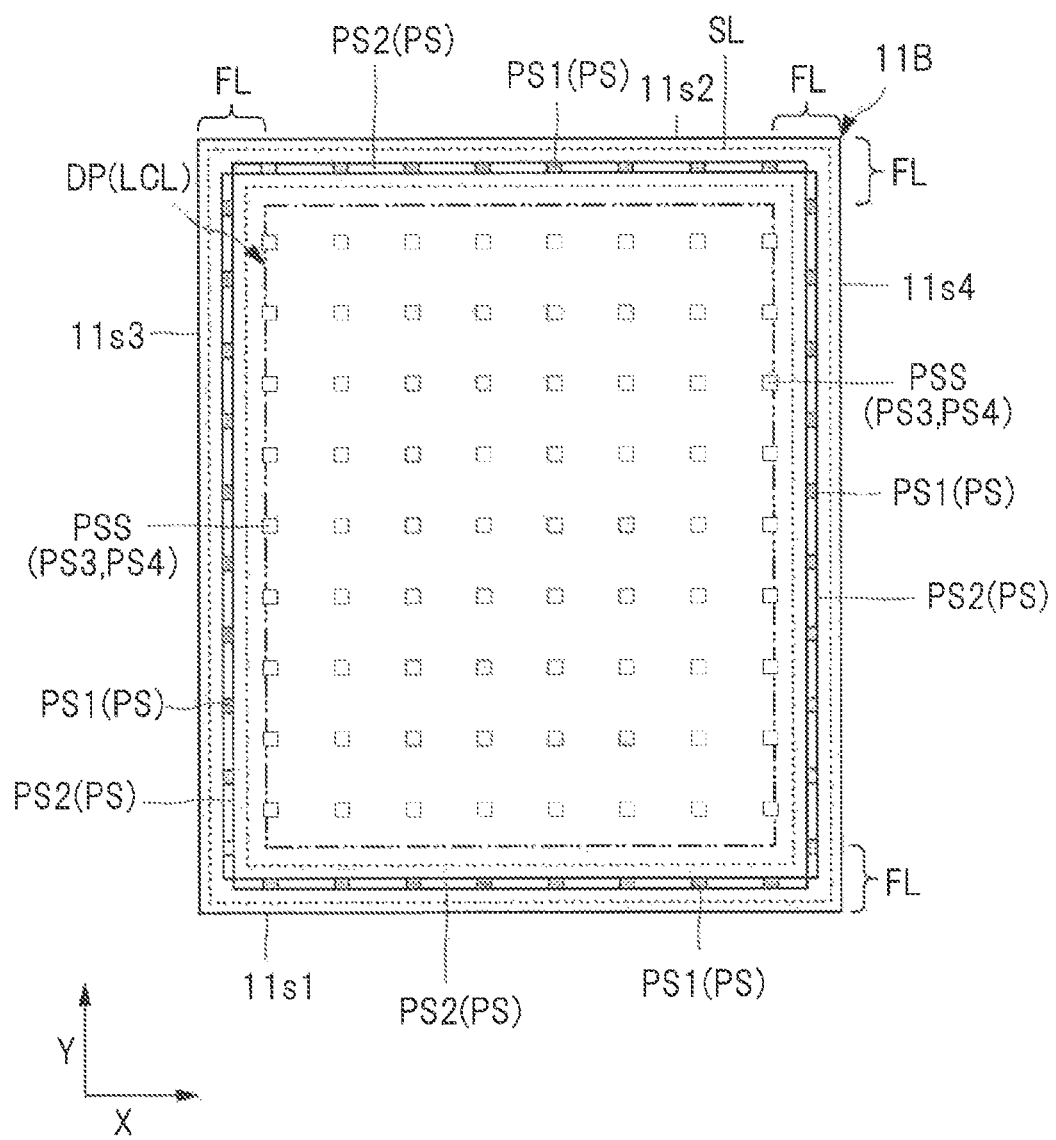
FIG. 11 is a plan view illustrating another modification example of FIG. 7.

In the above-mentioned embodiment, an example in which the member PS is formed to continuously surround the periphery of the display section DP has been described. However, as illustrated in FIG. 11 that is another modification example of FIG. 7, members PS, which are separated from one another, may be respectively formed along sides 11s1, 11s2, 11s3, and 11s4 of a substrate 11B. The member PS is a member for suppressing spreading of an oriented film AF1, as illustrated in FIG. 3. Thus, the member PS is particularly preferably formed to continuously surround the periphery of a display section DP, i.e., not to be divided halfway.

However, when a direction in which the oriented film AF1, as illustrated in FIG. 3, spreads is considered, the oriented film AF1 easily spreads toward each of the sides from the display section DP, and does not easily spread toward a corner serving as an intersection of the sides. Therefore, the independent members PS may be respectively formed along the sides 11s1, 11s2, 11s3, and 11s4 of the substrate 11B, as illustrated in FIG. 11. However, each of the plurality of members PS includes a plurality of portions PS1 and a plurality of portions PS2. Even if the member PS is divided, the sealing section SL needs to continuously surround the display section DP, so as to seal a liquid crystal. Therefore, in the modification example illustrated in FIG. 11, a sealing material SLp, as illustrated in FIG. 4, also needs to continuously surround the periphery of the display section DP.

In the above-mentioned embodiment, an example in which the oriented film AF1 is arranged between the sealing material SLp and a resin layer OC1 inside the member PS has been described. However, the oriented film AF1 may not be arranged between the sealing material SLp and the resin layer OC1 depending on how the oriented film AF1 spreads when formed. Even in this case, an effect of improving the fluidity of the sealing material SLp is also obtained by forming the members PS in the sealing section SL.

In the above-mentioned embodiment, as illustrated in FIG. 6, an example in which the portion PS1 in the member PS contacts both the back surface 11b of the substrate 11 and the front surface 12f of the substrate 12, and the portion PS2 therein contacts the back surface 11b of the substrate 11 and does not contact the front surface 12f of the substrate 12 has been described. However, if the member PS is formed on the side of the substrate 12, an example in which the portion PS2 in the member PS does not contact the back surface 11b of the substrate 11 but contacts the front surface 12f of the substrate 12 may be used.

According to the above-mentioned embodiment, as a result of the improvement in the fluidity of the sealing material SLp, the portion PS1 in the member PS easily contacts both the back surface 11b of the substrate 11 and the front surface 12f of the substrate 12. As a result, even if a part of the portion PS1 does not contact the front surface 12f of the substrate 12, there is no problem as long as the separation distance between the substrate 12 and the substrate 11 falls within an allowable range.

In the foregoing, the invention made by the inventors of the present invention has been concretely described based on the embodiments. However, it is needless to say that the present invention is not limited to the foregoing embodiments and various modifications and alterations can be made within the scope of the present invention.

In the above-mentioned embodiment and modification examples, the plurality of spacer members PSS mainly formed in the display section DP do not overlap the sealing section SL in the thickness direction, as illustrated in FIG. 7, for example. If the independent members, for example, the spacer members PSS are arranged apart from one another, however, this cannot be easily a factor inhibiting movement of a fluid. Therefore, the spacer member PSS may be formed at a position overlapping the sealing section SL, for example. However, the plurality of spacer members PSS are not preferably formed in the sealing section SL, as illustrated in FIG. 7, from the viewpoint of more reliably spreading the sealing material SLp illustrated in FIG. 4. While the display device using the liquid crystal layer as the display functional layer is described in the above-mentioned embodiment, the present invention is not limited to thereto. For example, the display device using the liquid crystal layer may be replaced with a display device of an organic electroluminescence (EL) type. In this case, a sealing material to be sealed between substrates may include a sealing material such as resin in addition to an organic emitting material. In this case, the sealing material does not directly contribute to display, but herein is referred to as a display functional layer.

In the category of the idea of the present invention, a person with ordinary skill in the art can conceive various modification examples and revised examples, and such modification examples and revised examples are also deemed to belong to the scope of the present invention. For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention is applicable to a display device such as a liquid crystal display device and an electronic apparatus incorporating the display device.

What is claimed is:
1. A liquid crystal display device comprising a first substrate, a second substrate opposing the first substrate, a liquid crystal layer arranged between the first substrate and the second substrate, and a sealing section that adhesively fixes the first substrate and the second substrate around the liquid crystal layer,
wherein the sealing section includes:
a sealing material continuously surrounding a periphery of the liquid crystal layer in a plan view,
a spacer portion arranged in the sealing section and extending along an outer edge of the first substrate or the second substrate in a plan view; and
the spacer portion includes:
a first spacer member,
a second spacer member,
the first spacer member contacts the first substrate and the second substrate, and the second spacer member contacts either one of the first substrate and the second substrate and does not contact the other substrate,
the first spacer member is formed in a wall shape along the extending direction of the sealing section,
the second spacer member is formed in a wall shape along the extending direction of the sealing section,
a length of the first spacer member is shorter than a length of the second spacer member,
a height of the first spacer member is higher than a height of the second spacer member, a third spacer member and a fourth spacer member which are formed between the first substrate and the second substrate in a display region where the liquid crystal layer is formed, the third spacer member having the same height as the first spacer member, and the fourth spacer member having the same height as the second spacer member, and the respective planar sizes of the third spacer member and the fourth spacer member are substantially the same as that of the first spacer member.

2. The liquid crystal display device according to claim 1, wherein the first spacer member and the second spacer member are alternately arranged.

3. The liquid crystal display device according to claim 1, wherein the first substrate has an orientation film formed on an interface contacting the liquid crystal layer, and a part of the sealing material overlaps a peripheral edge of the orientation film in a thickness direction, on the side of the liquid crystal layer of the spacer portion.

4. The liquid crystal display device according to claim 1, wherein a value obtained by dividing the length of the first spacer member by a sum of the length of the first spacer member and the length of the second spacer member is not less than 5% and not more than 30%.

5. The liquid crystal display device according to claim 1, wherein the first spacer member and the second spacer member are formed to continuously surround a periphery of the display section where the liquid crystal layer is formed, in a plan view.

6. The liquid crystal display device according to claim 1, wherein the first substrate includes, in a plan view, a first side extending in a first direction, a second side opposing the first side, a third side extending in a second direction perpendicular to the first direction, and a fourth side opposing the third side, a distance from the display section where the liquid crystal layer is formed to the first side in a plan view is longer than a distance from the display section to the second side, a distance from the display section to the third side, and a distance from the display section to the fourth side, and the first spacer member and the second spacer member extend along each of the second side, the third side, and the fourth side.

7. The liquid crystal display device according to claim 1, wherein a color filter and a resin layer covering the color filter are formed on the first substrate, and the first spacer member and the second spacer member are formed on the resin layer.

8. The liquid crystal display device according to claim 1, wherein the sealing material does not include a glass fiber.

* * * * *